United States Patent
Jiang

(10) Patent No.: US 11,201,826 B2
(45) Date of Patent: Dec. 14, 2021

(54) METHOD AND APPARATUS FOR PROCESSING SERVICE FLOW IN PACKET NETWORK

(71) Applicant: Huawei Technologies Co., Ltd., Shenzhen (CN)

(72) Inventor: Yuanlong Jiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 217 days.

(21) Appl. No.: 16/545,218

(22) Filed: Aug. 20, 2019

(65) Prior Publication Data

US 2019/0379608 A1 Dec. 12, 2019

Related U.S. Application Data

(63) Continuation of application No. PCT/CN2018/074799, filed on Jan. 31, 2018.

(30) Foreign Application Priority Data

Feb. 20, 2017 (CN) .......................... 201710090953.5

(51) Int. Cl.
*H04L 12/26* (2006.01)
*H04L 12/801* (2013.01)
*H04L 12/723* (2013.01)

(52) U.S. Cl.
CPC .............. *H04L 47/34* (2013.01); *H04L 45/50* (2013.01)

(58) Field of Classification Search
CPC ....................................................... H04L 47/35
See application file for complete search history.

(56) References Cited

U.S. PATENT DOCUMENTS

| 8,724,452 B2 | 5/2014 | Nakash |
| 8,724,456 B1 | 5/2014 | Hong et al. |

(Continued)

FOREIGN PATENT DOCUMENTS

| CN | 101257441 A | 9/2008 |
| CN | 101902353 A | 12/2010 |
| CN | 105991359 A | 10/2016 |

OTHER PUBLICATIONS

Machine Translation and Abstract of Chinese Publication No. CN101257441, Sep. 3, 2008, 19 pages.

(Continued)

*Primary Examiner* — Sulaiman Nooristany
(74) *Attorney, Agent, or Firm* — Conley Rose, P.C.

(57) ABSTRACT

A method for processing a service flow in a packet network, where the method is applied to a network device group including a first network device and a second network device connected to the first network device. The method includes: the first network device obtains a first upstream service flow, and receives a second upstream service flow from the second network device; the first network device obtains a third upstream service flow based on a first reference sequence number, a sequence number included in each upstream data packet in the first upstream service flow, and a sequence number included in each upstream data packet in the second upstream service flow, where a sequence number included in any upstream data packet in the third upstream service flow is greater than the first reference sequence number; and sends the third upstream service flow to a next hop node.

20 Claims, 10 Drawing Sheets

(56) References Cited

U.S. PATENT DOCUMENTS

| | | | |
|---|---|---|---|
| 2004/0156313 A1* | 8/2004 | Hofmeister | H04L 49/253 370/229 |
| 2007/0183376 A1 | 8/2007 | Arai et al. | |
| 2009/0296568 A1 | 12/2009 | Kitada | |
| 2012/0170449 A1 | 7/2012 | Nakash | |

OTHER PUBLICATIONS

Machine Translation and Abstract of Chinese Publication No. CN101902353, Dec. 1, 2010, 28 pages.
Machine Translation and Abstract of Chinese Publication No. CN105991359, Oct. 5, 2016, 19 pages.
Finn, N., et al., "Deterministic Networking Problem Statement," draft-ietf-detnet-problem-statement-01, Sep. 28, 2016, 11 pages.
Grossman, E. Ed., et al., "Deterministic Networking Use Cases," draft-ietf-detnet-use-cases-11, Oct. 3, 2016, 79 pages.
Cheng, W., et al., "Dual-Homing Protection for MPLS and MPLS-TP Pseudowires," draft-ietf-pals-mpls-tp-dual-homing-protection-05, Jan. 17, 2017, 11 pages.
Bryant, S., Ed., et al., "Pseudo Wire Emulation Edge-to-Edge (PWE3) Architecture," RFC 3985, Mar. 2005, 42 pages.
Bryant, S., et al., "Pseudowire Emulation Edge-to-Edge (PWE3) Control Word for Use over an MPLS PSN," RFC 4385, Feb. 2006, 12 pages.
"Series G: Transmission Systems and Media, Digital Systems and Networks, Packet over Transport aspects—MPLS over Transport aspects, Series Y: Global Information Infrastructure, Internet Protocol Aspects and Next-Generation Networks, Internet of Things and Smart Cities, Internet protocol aspects—Transport, Linear protection switching for MPLS transport profile, Amendment 2" ITU-TG.8131/Y.1382, Amendment 2, Nov. 2016, 38 pages.
Foreign Communication From A Counterpart Application, Chinese Application No. 201710090953.5, Chinese Office Action dated May 5, 2019, 5 pages.
Foreign Communication From A Counterpart Application, PCT Application No. PCT/CN2018/074799, English Translation of International Search Report dated Mar. 26, 2018, 2 pages.
Foreign Communication From A Counterpart Application, PCT Application No. PCT/CN2018/074799, English Translation of Written Opinion dated Mar. 26, 2018, 5 pages.
Foreign Communication From A Counterpad Application, European Application No. 18754372.3, Extended European Search Report dated Jan. 3, 2020, 5 pages.

\* cited by examiner

METHOD AND APPARATUS FOR PROCESSING SERVICE FLOW IN PACKET NETWORK

CROSS-REFERENCE TO RELATED APPLICATIONS

This application a continuation of International Patent Application No. PCT/CN2018/074799, filed on Jan. 31, 2018, which claims priority to Chinese Patent Application No. 201710090953.5, filed on Feb. 20, 2017. The disclosures of the aforementioned applications are hereby incorporated by reference in their entireties.

TECHNICAL FIELD

This application relates to the communications field, and in particular, to a method and an apparatus for processing a service flow in a packet network.

BACKGROUND

Generally, in a Multiprotocol Label Switching (MPLS) network, fast reroute (FRR) is used to partially protect a link or a node on a label switching path (LSP), or a secondary end-to-end LSP is established to protect a working LSP. Once the working LSP is faulty, all flows on the working LSP and all pseudo wires (PW) corresponding to the flows are switched to the secondary LSP. The FRR or end-to-end protection technology cannot provide protection against a fault caused by a provider edge (PE) device.

To protect a PE device, a link, an LSP, a PW, or the like from a plurality of faults, a directly connected PW may be established between two PE devices to which a same customer edge (CE) device is dual-homed, for example, a D-PW1 between a PE1 and a PE2 and a D-PW2 between a PE3 and a PE4 in FIG. 1.

As shown in FIG. 1, a CE1 is dual-homed to the PE1 and the PE2, that is, the CE1 is connected to the PE1 by using an AC1, and the CE1 is connected to the PE2 by using an AC2. The PE1 and the PE2 are connected by using a directly connected PW, such as the D-PW1. A CE2 is dual-homed to the PE3 and the PE4, that is, the CE2 is connected to the PE3 by using an AC3, and the CE2 is connected to the PE4 by using an AC4. The PE3 and the PE4 are connected by using a directly connected PW, such as the D-PW2. The AC1, the AC2, the AC3, and the AC4 are attachment circuits (AC) in the MPLS network.

When service data flows from the PE1 to the CE1, the PE1 receives the service data by using a PW1 connected to the PE3. The PE1 obtains two pieces of service data after replicating the service data. The PE1 sends one of the two pieces of service data to the CE1 by using the AC1. The PE1 sends the other of the two pieces of service data to the PE2 by using the D-PW1. The PE2 sends, to the CE1 by using the AC2, the service data received by using the D-PW1. The CE1 performs fault detection on the AC1. When the AC1 is normal, the CE1 receives the service data from the AC1; or when the AC1 is faulty, the CE1 receives the service data from the AC2.

When service data flows from the CE1 to the PE1, the CE1 sends two pieces of redundant service data to the PE1 and the PE2. That is, the CE1 sends one piece of service data to the PE1 by using the AC1, and the CE1 sends the other piece of service data to the PE2 by using the AC2. After receiving the service data sent by the CE1, the PE2 sends the service data to the PE1 by using the D-PW1. The PE1 performs fault detection on the AC1. When the AC1 is normal, the PE1 receives the service data from the AC1; or when the AC1 is faulty, the PE1 receives the service data from the D-PW1. Then, the PE1 sends the service data to the PE3 by using a PW1.

In the foregoing method, the PE1 and the CE1 each need to perform fault detection on the AC1 connected to the PE1 and the CE1, and switch a service data receiving manner based on a fault detection result. Consequently, forwarding efficiency is relatively low and fault locating needs to be performed, and reliability of service forwarding needs to be further improved.

SUMMARY

Embodiments of this application provide a method and an apparatus for processing a service flow in a packet network, to help simplify fault detection and a switching operation, and improve forwarding efficiency.

According to a first aspect, a method for processing a service flow in a packet network is provided, where the method is applied to a network device group, the network device group includes a first network device and a second network device, the first network device is connected to the second network device, the first network device communicates with a third network device, the second network device communicates with a fourth network device, and the method includes: obtaining, by the first network device, a first upstream service flow, where the first upstream service flow includes at least one upstream data packet, each upstream data packet in the first upstream service flow includes a sequence number, the sequence number included in each upstream data packet in the first upstream service flow is used to identify a sequence that is in the first upstream service flow and that is of the upstream data packet including the sequence number, and the first upstream service flow is an upstream service flow received by the first network device from the third network device, or is a service flow obtained by the first network device by replicating an upstream service flow from the third network device; receiving, by the first network device by using a first pseudo wire, a second upstream service flow sent by the second network device, where the second upstream service flow includes at least one upstream data packet, each upstream data packet in the second upstream service flow includes a sequence number, the sequence number included in each upstream data packet in the second upstream service flow is used to identify a sequence that is in the second upstream service flow and that is of the upstream data packet including the sequence number, and the second upstream service flow is an upstream service flow received by the second network device from the fourth network device, or is a service flow obtained by the second network device by replicating an upstream service flow from the fourth network device; obtaining, by the first network device, a third upstream service flow based on a first reference sequence number and a sequence number included in each upstream data packet in N received upstream service flows, where the third upstream service flow includes at least one upstream data packet, the N upstream service flows include the first upstream service flow and the second upstream service flow, and a sequence number included in any upstream data packet in the third upstream service flow is greater than the first reference sequence number; and sending, by the first network device, the third upstream service flow to a fifth network device.

N is an integer greater than or equal to 2.

In the foregoing method, the first network device and the second network device use a method for replicating a service flow, selecting a service flow based on a sequence number, and sending the service flow, to perform high-reliability service protection on a service flow transmitted between the third network device and the fifth network device in the packet network. A service can be protected from being affected by a single point of failure or even a specific multipoint failure in the network, without a need to perform coordination between fault detection and a switching action by any device in the first network device, the second network device, the third network device, and the fifth network device. In the method, protocol complexity brought when a conventional technology based on automatic protection switching is used is avoided, and the method is easier to implement on a network device, such that scalability of an MPLS network can be improved.

Optionally, the method further includes: receiving, by the first network device, an upstream service flow from the third network device, and replicating the upstream service flow from the third network device; and sending, by the first network device, a fourth upstream service flow to the second network device by using the first pseudo wire, where the fourth upstream service flow is the upstream service flow from the third network device, or is a service flow obtained by replicating the upstream service flow from the third network device.

In the foregoing method, the first network device may use a method for replicating an upstream service flow and sending the upstream service flow or an upstream service flow obtained through replication to the second network device, to improve service reliability on a second network device side. This helps avoid a case in which an upstream service flow transmitted by the second network device is interrupted because the fourth network device is faulty.

Optionally, the method further includes: obtaining, by the first network device, a first downstream service flow, where the first downstream service flow includes at least one downstream data packet, each downstream data packet in the first downstream service flow includes a sequence number, the sequence number included in each downstream data packet in the first downstream service flow is used to identify a sequence that is in the first downstream service flow and that is of the downstream data packet including the sequence number, and the first downstream service flow is a downstream service flow received by the first network device from the fifth network device, or is a service flow obtained by the first network device by replicating a downstream service flow from the fifth network device; receiving, by the first network device by using a second pseudo wire, a second downstream service flow sent by the second network device, where the second downstream service flow includes at least one downstream data packet, each downstream data packet in the second downstream service flow includes a sequence number, the sequence number included in each downstream data packet in the second downstream service flow is used to identify a sequence that is in the second downstream service flow and that is of the downstream data packet including the sequence number, and the second downstream service flow is a downstream service flow received by the second network device from a sixth network device, or is a service flow obtained by the second network device by replicating a downstream service flow from a sixth network device; obtaining, by the first network device, a third downstream service flow based on a second reference sequence number and a sequence number included in each downstream data packet in M received downstream service flows, where the M downstream service flows include the first downstream service flow and the second downstream service flow, the third downstream service flow includes at least one downstream data packet, and a sequence number included in any downstream data packet in the third downstream service flow is greater than the second reference sequence number; and sending, by the first network device, the third downstream service flow to the third network device.

M is an integer greater than or equal to 2.

In the foregoing method, an upstream service flow and a downstream service flow on the first network device are separately protected by using two bidirectional pseudo wires. This helps further improve service reliability.

Optionally, the method further includes: receiving, by the first network device, a downstream service flow from the fifth network device, and replicating the downstream service flow from the fifth network device; and sending, by the first network device, a fourth downstream service flow to the second network device by using the second pseudo wire, where the fourth downstream service flow is the downstream service flow from the fifth network device, or is a service flow obtained by replicating the downstream service flow from the fifth network device.

In the foregoing method, the first network device may use a method for replicating a downstream service flow and sending the downstream service flow or a downstream service flow obtained through replication to the second network device, to improve service reliability on the second network device side. This helps avoid a case in which a downstream service flow transmitted by the second network device is interrupted.

In a possible implementation, the obtaining, by the first network device, a third upstream service flow based on a first reference sequence number and a sequence number included in each upstream data packet in N received upstream service flows includes: selecting, by the first network device as the third upstream service flow based on the sequence number included in each upstream data packet in the first upstream service flow and the sequence number included in each upstream data packet in the second upstream service flow, a plurality of upstream data packets including sequence numbers whose values are greater than the first reference sequence number, where an $i^{th}$ upstream data packet is any upstream data packet in the third upstream service flow, a sequence number included in the $i^{th}$ upstream data packet is greater than the first reference sequence number, a sequence number included in a $(i+1)^{th}$ upstream data packet is greater than the sequence number included in the $i^{th}$ upstream data packet, and the $(i+1)^{th}$ upstream data packet follows the $i^{th}$ upstream data packet in the third upstream service flow.

In the foregoing method, the first network device obtains the third upstream service flow by using the first reference sequence number and a sequence number included in an upstream data packet. This helps avoid a case in which same upstream data packets (upstream data packets including a same sequence number) exist in the third upstream service flow and/or same upstream data packets are repeatedly sent, and helps improve forwarding efficiency.

In another possible implementation, the obtaining, by the first network device, a third upstream service flow based on a first reference sequence number and a sequence number included in each upstream data packet in N received upstream service flows includes: sorting, by the first network device based on an arrival moment of each upstream data packet in the first upstream service flow and an arrival moment of each upstream data packet in the second upstream service flow, the upstream data packet included in the first upstream service flow and the upstream data packet included in the second upstream service flow, to obtain a sorted upstream service flow; and selecting, by the first network device as the third upstream service flow from the sorted upstream service flow, a plurality of upstream data packets including sequence numbers whose values are greater than the first reference sequence number, where a sequence number included in an $i^{th}$ upstream data packet in the third upstream service flow is greater than the first reference sequence number, an arrival moment of an $(i+1)^{th}$ upstream data packet in the third upstream service flow is later than an arrival moment of the $i^{th}$ upstream data packet, a sequence number included in the $(i+1)^{th}$ upstream data packet is greater than the sequence number included in the $i^{th}$ upstream data packet, and the $i^{th}$ upstream data packet is any upstream data packet in the third upstream service flow.

In a possible implementation, the obtaining, by the first network device, a third downstream service flow based on a second reference sequence number and a sequence number included in each downstream data packet in M received downstream service flows includes: selecting, by the first network device as the third downstream service flow based on the sequence number included in each downstream data packet in the first downstream service flow and the sequence number included in each downstream data packet in the second downstream service flow, a plurality of downstream data packets including sequence numbers whose values are greater than the second reference sequence number, where a $j^{th}$ downstream data packet is any downstream data packet in the third downstream service flow, a sequence number included in the $j^{th}$ downstream data packet is greater than the second reference sequence number, a sequence number included in a $(j+1)^{th}$ downstream data packet is greater than the sequence number included in the $j^{th}$ downstream data packet, and the $(j+1)^{th}$ downstream data packet follows the $j^{th}$ downstream data packet in the third downstream service flow.

In the foregoing method, the first network device obtains the third downstream service flow by using the second reference sequence number and a sequence number included in a downstream data packet. This helps avoid a case in which same downstream data packets (downstream data packets including a same sequence number) exist in the third downstream service flow and/or same downstream data packets are repeatedly sent, and helps improve forwarding efficiency.

In another possible implementation, the obtaining, by the first network device, a third downstream service flow based on a second reference sequence number and a sequence number included in each downstream data packet in M received downstream service flows includes: sorting, by the first network device based on an arrival moment of each downstream data packet in the first downstream service flow and an arrival moment of each downstream data packet in the second downstream service flow, the downstream data packet included in the first downstream service flow and the downstream data packet included in the second downstream service flow, to obtain a sorted downstream service flow; and selecting, by the first network device as the third downstream service flow from the sorted downstream service flow, a plurality of downstream data packets including sequence numbers whose values are greater than the second reference sequence number, where a sequence number included in a $j^{th}$ downstream data packet in the third downstream service flow is greater than the second reference sequence number, an arrival moment of a $(j+1)^{th}$ downstream data packet in the third downstream service flow is later than an arrival moment of the $j^{th}$ downstream data packet, a sequence number included in the $(j+1)^{th}$ downstream data packet is greater than the sequence number included in the $j^{th}$ downstream data packet, and the $j^{th}$ downstream data packet is any downstream data packet in the third downstream service flow.

Optionally, the method further includes: updating, by the first network device, a value of the first reference sequence number by using a maximum value of a sequence number included in the upstream data packet in the third upstream service flow.

In the foregoing method, the first network device updates the first reference sequence number. This helps avoid a case in which same upstream data packets (upstream data packets including a same sequence number) are repeatedly sent, and helps improve forwarding efficiency and continuity of the upstream service flow.

Optionally, the method further includes: updating, by the first network device, a value of the second reference sequence number by using a maximum value of a sequence number included in the downstream data packet in the third downstream service flow.

In the foregoing method, the first network device updates the second reference sequence number. This helps avoid a case in which same downstream data packets (downstream data packets including a same sequence number) are repeatedly sent, and helps improve forwarding efficiency and continuity of the downstream service flow.

In a possible implementation, the first network device is a first PE device, the second network device is a second PE device, the third network device is a CE device, and the fourth network device is a CE device; or the first network device is a first PW switching point (SPE), the second network device is a second SPE, the third network device is a first PE device, the fourth network device is a second PE device, and the first PE device and the second PE device communicate with a same CE device; or the first network device is a first SPE, the second network device is a second SPE, the third network device is a first PE device, the fourth network device is a second PE device, and the first PE device and the second PE device belong to a network device group; or the first network device is a first SPE, the second network device is a second SPE, the third network device is a first PE device, the fourth network device is a second PE device, the first PE device and the second PE device belong to a network device group, and the first PE device and the second PE device communicate with a same CE device.

In a possible implementation, the fifth network device and the sixth network device are a same PE device, or the fifth network device and the sixth network device are different PE devices, or the fifth network device and the sixth network device are different SPEs.

Optionally, when the first network device is a PE device and the third network device is a CE device, the obtaining, by the first network device, a first upstream service flow includes: receiving, by the first network device, an Ethernet frame from the third network device; obtaining, by the first network device, a sequence number based on the Ethernet frame; and obtaining, by the first network device based on the Ethernet frame and the sequence number, an upstream data packet included in the first upstream service flow, where the upstream data packet includes the Ethernet frame and the sequence number.

The obtaining, by the first network device, a sequence number based on the Ethernet frame includes: performing, by the first network device, calculation on the received Ethernet frame, to obtain the sequence number; or obtaining, by the first network device from the Ethernet frame, a sequence number carried in the Ethernet frame.

The obtaining, by the first network device based on the Ethernet frame and the sequence number, an upstream data packet included in the first upstream service flow includes: encapsulating, by the first network device, the sequence number into an outer layer of the Ethernet frame, to obtain the upstream data packet; or adding, by the first network device, the sequence number into a context of the Ethernet frame, to obtain the upstream data packet.

The foregoing method for obtaining a sequence number and an upstream data packet can ensure that values of sequence numbers carried in same upstream data packets are the same. This helps avoid a case in which repeated upstream data packets exist in the upstream service flow.

According to a second aspect, an apparatus for processing a service flow in a packet network is provided, where the apparatus is disposed in a first network device in a network device group, the network device group further includes a second network device, the first network device is connected to the second network device, the first network device communicates with a third network device, the second network device communicates with a fourth network device, and the apparatus includes modules configured to implement any one of the first aspect or the possible implementations of the first aspect.

According to a third aspect, a system for processing a service flow in a packet network is provided, where the system includes the apparatus provided in the second aspect and a second network device, the apparatus provided in the second aspect is disposed in a first network device, the first network device is connected to the second network device, the first network device communicates with a third network device, and the second network device communicates with a fourth network device.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

Figure 1:
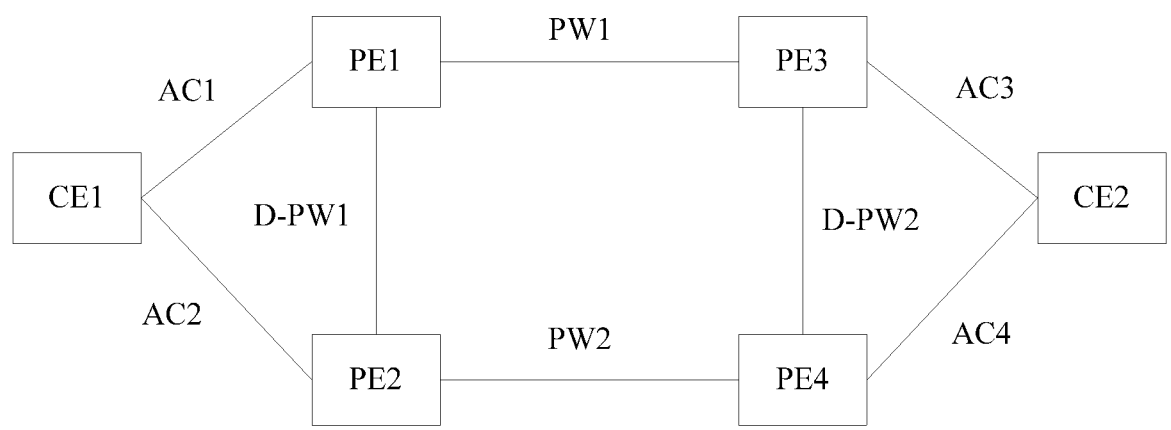
FIG. 1 is a schematic structural diagram of an existing packet network protection system.

Application scenarios described in embodiments of this application are intended to describe the technical solutions in the embodiments of this application more clearly, but are not intended to limit the technical solutions provided in the embodiments of this application. A person of ordinary skill in the art may learn that with evolution of a network architecture and emergence of a new service scenario, the technical solutions provided in the embodiments of this application are also applicable to a similar technical problem.

The embodiments of this application provide a method for processing a service flow in a packet network. The method is applied to a network device group. The network device group includes a first network device and a second network device. The first network device communicates with the second network device and a third network device. The second network device communicates with a fourth network device. The first network device and the second network device have similar structures and functions. The method includes the following steps: The first network device obtains a first upstream service flow. The first upstream service flow includes at least one upstream data packet. Each upstream data packet in the first upstream service flow includes a sequence number. The sequence number included in each upstream data packet in the first upstream service flow is used to identify a sequence that is in the first upstream service flow and that is of the upstream data packet including the sequence number. The first upstream service flow is an upstream service flow received by the first network device from the third network device, or is a service flow obtained by the first network device by replicating an upstream service flow from the third network device. The first network device receives, by using a first pseudo wire, a second upstream service flow sent by the second network device. The second upstream service flow includes at least one upstream data packet. Each upstream data packet in the second upstream service flow includes a sequence number. The sequence number included in each upstream data packet in the second upstream service flow is used to identify a sequence that is in the second upstream service flow and that is of the upstream data packet including the sequence number. The second upstream service flow is an upstream service flow received by the second network device from the fourth network device, or is a service flow obtained by the second network device by replicating an upstream service flow from the fourth network device. The first network device obtains a third upstream service flow based on a first reference sequence number and a sequence number included in each upstream data packet in N received upstream service flows. The third upstream service flow includes at least one upstream data packet. The N upstream service flows include one or more of the first upstream service flow and the second upstream service flow. A sequence number included in any upstream data packet in the third upstream service flow is greater than the first reference sequence number. The first network device sends the third upstream service flow to a fifth network device.

Figure 2:
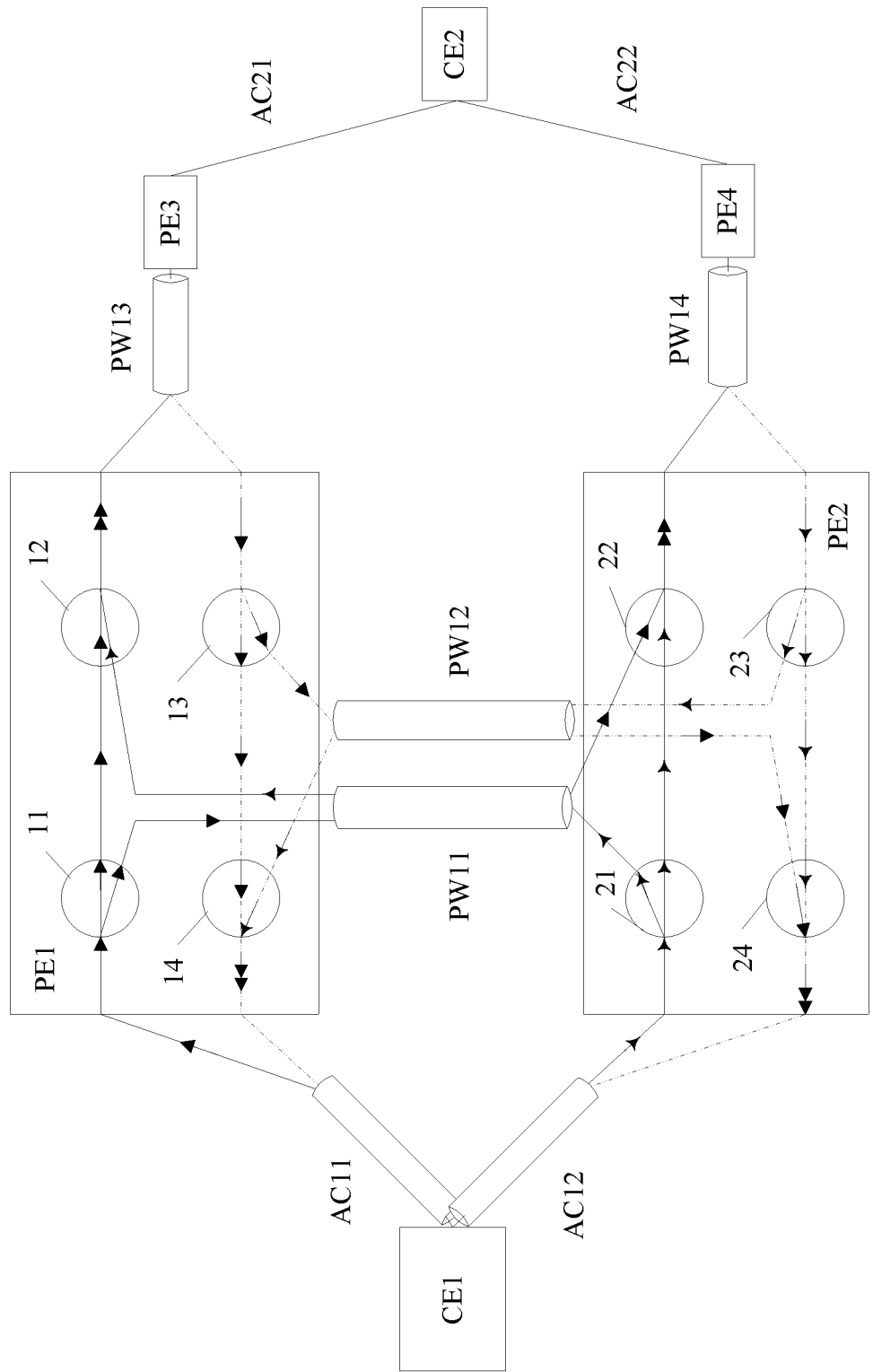
FIG. 2 is a schematic diagram of a first network scenario according to an embodiment of this application.

FIG. 2 is a schematic diagram of a first network scenario according to an embodiment of this application. In the first network scenario provided in this embodiment of this application, a CE1 communicates with a PE1 by using an AC11, and the CE1 communicates with a PE2 by using an AC12. The PE1 communicates with the PE2 by using two bidirectional PWs: a PW11 and a PW12. If sending a packet by the CE1 to a CE2 is referred to as upstream communication, and sending a packet by the CE2 to the CE1 is referred to as downstream communication, the PW11 is used to protect upstream communication between the PE1 and the PE2, and the PW12 is used to protect downstream communication between the PE1 and the PE2. If sending a packet by the CE1 to a CE2 is referred to as downstream communication, and sending a packet by the CE2 to the CE1 is referred to as upstream communication, the PW11 is used to protect downstream communication between the PE1 and the PE2, and the PW12 is used to protect upstream communication between the PE1 and the PE2. The PE1 includes a first replicator 11, a first selector 12, a second replicator 13, and a second selector 14. The first replicator 11 and the first selector 12 are configured to process packets in a same direction. The second replicator 13 and the second selector 14 are configured to process packets in a same direction. A direction in this embodiment of this application is an upstream communication direction or a downstream communication direction. To be distinguished from the replicator and the selector that are included in the PE1, a replicator 21 included in the PE2 is a third replicator 21, a selector 22 included in the PE2 is a third selector 22, a replicator 23 included in the PE2 is a fourth replicator 23, and a selector 24 included in the PE2 is a fourth selector 24. The PE1 communicates with a PE3 by using a PW13. The PE2 communicates with a PE4 by using a PW14. The PE3 communicates with the CE2 by using an AC21. The PE4 communicates with the CE2 by using an AC22. The PE1 and the PE2 may form a network device group in the first network scenario. The PE3 and the PE4 may form another network device group in the first network scenario.

Figure 5A:
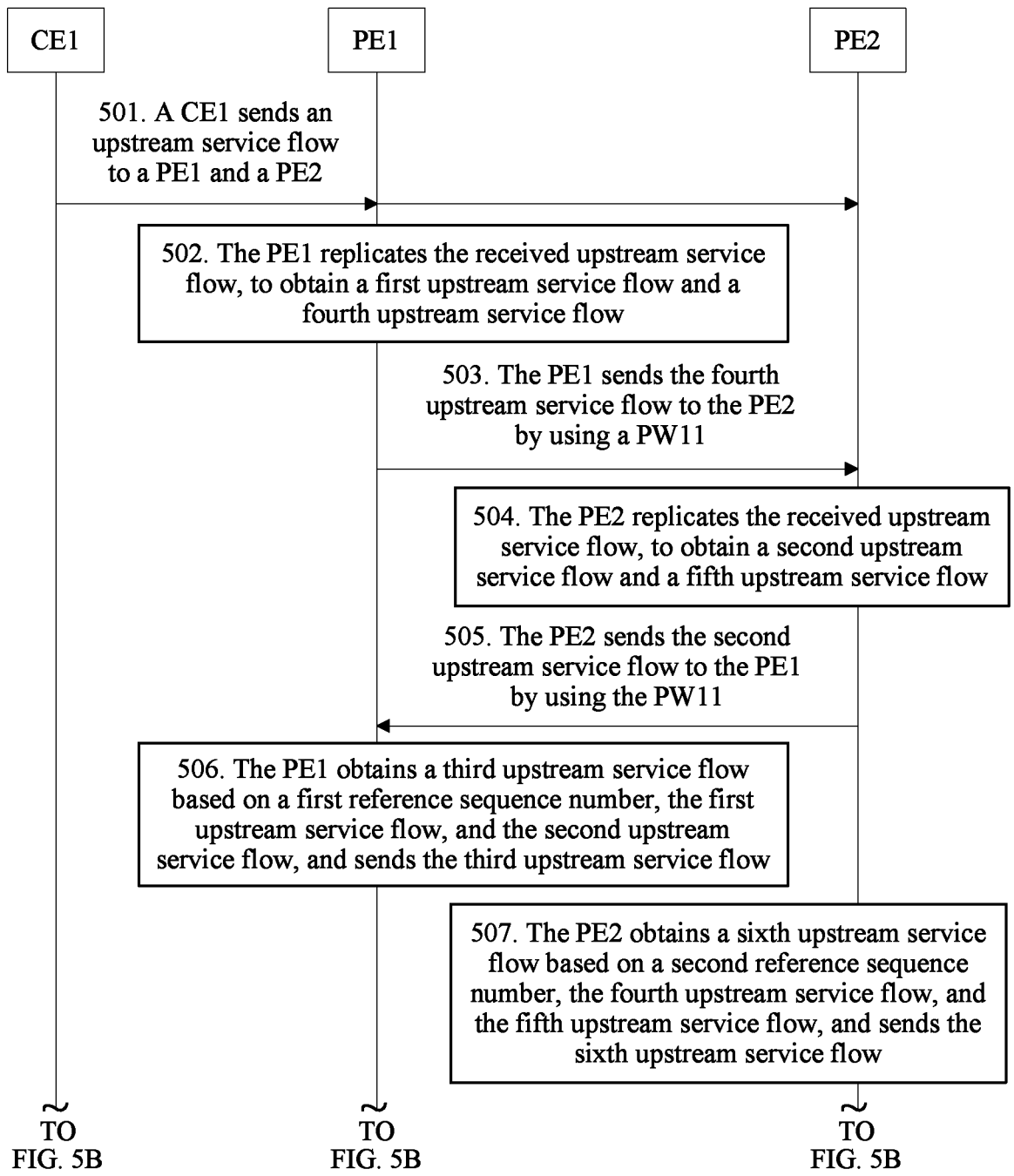
FIG. 5A and FIG. 5B are flowcharts of a method for processing a service flow in a packet network according to Embodiment 1 of this application.
Figure 5B:
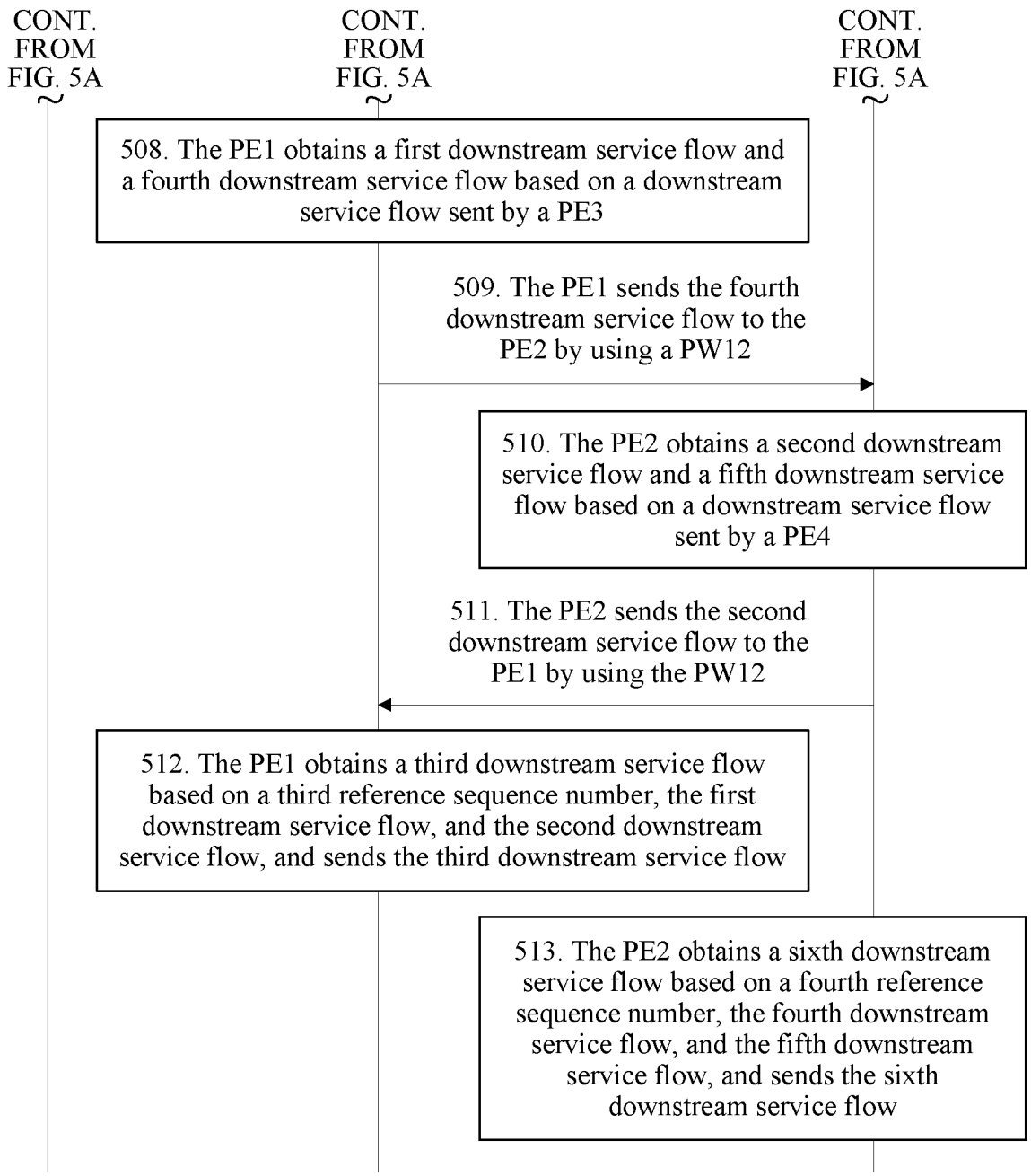

FIG. 5A and FIG. 5B are flowcharts of a method for processing a service flow in a packet network according to Embodiment 1 of this application. The method for processing a service flow in a packet network provided in Embodiment 1 of this application may be used for any PE in the PE1, the PE2, the PE3, and the PE4 in FIG. 2. With reference to FIG. 2, FIG. 5A, and FIG. 5B, the following uses the PE1 and the PE2 as an example to describe the method for processing a service flow in a packet network provided in Embodiment 1 of this application. On a PE, a service flow may be identified by using an Ethernet packet type, a physical port, or a logical port, or may be identified by using a specific protocol field of an upper-layer protocol or a combination including the specific protocol field. A virtual local area network identifier (VID) corresponding to the logical port may be used to identify a service flow. The specific protocol field of the upper-layer protocol may be a source Internet Protocol (IP) address, a destination IP address, a differentiated services code point (DSCP), a type of service (TOS), a Transmission Control Protocol (TCP), or a TCP layer port number.

501. The CE1 sends an upstream service flow to the PE1 and the PE2.

For example, the CE1 may replicate an upstream service flow to obtain two upstream service flows. The CE1 sends one service flow in the two upstream service flows to the PE1 by using the AC11. For example, when the AC11 is an Ethernet connection, the upstream service flow may be a series of Ethernet frames on an Ethernet port or in a VLAN. The Ethernet connection may be implemented by using an optical fiber or a twisted pair. Alternatively, the AC11 may be another type of link, and examples are not given one by one herein for description. The CE1 sends the other service flow in the two upstream service flows to the PE2 by using the AC12. For example, when the AC12 is an Ethernet connection, the service flow may be a series of Ethernet frames on an Ethernet port or in a VLAN. The AC12 and the AC11 may be a same type of link. The upstream service flow includes at least one upstream data packet. Each upstream data packet included in the upstream service flow carries a sequence number. The sequence number carried in each upstream data packet is used to identify a sequence that is in the upstream service flow and that is of the upstream data packet including the sequence number. The sequence may also be understood as a relative location or an absolute location.

502. The PE1 replicates the received upstream service flow, to obtain a first upstream service flow and a fourth upstream service flow.

Figure 7:
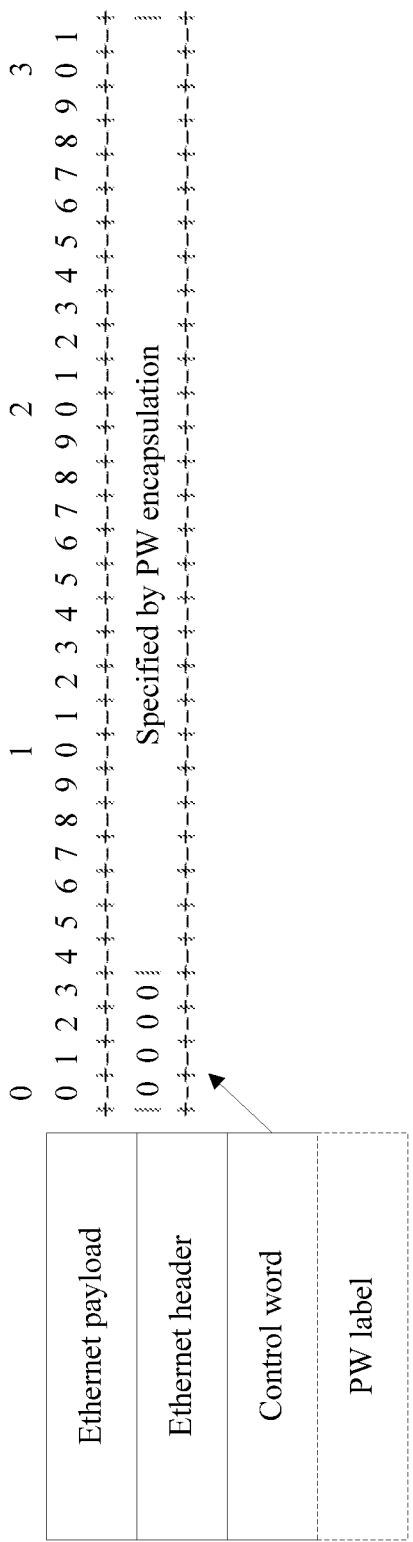
FIG. 7 is a schematic diagram of a data packet that carries a control word according to an embodiment of this application.

For example, the PE1 receives, from the AC11, any Ethernet frame included in the upstream service flow sent by the CE1. In an implementation, the PE1 adds, to the any Ethernet frame on a port module (an ingress port module) connected to the AC11, an encapsulation header related to a sequence number. For example, the PE1 adds, to the any Ethernet frame, a control word that carries the sequence number, to obtain an upstream data packet that carries the control word. A complete pseudo wire encapsulation format of a data packet that carries a control word is shown in FIG. 7. As shown in FIG. 7, an Ethernet payload is a payload included in the Ethernet frame. An Ethernet header is a header included in the Ethernet frame. The control word may be used to carry the sequence number. That is, during encapsulation, the sequence number may be placed at the last 16 bits or the last 28 bits in the pseudo wire control word, or may be placed at separate 4 bytes between the Ethernet header and the control word. Using the last 28 bits in the control word to carry the sequence number helps prolong a time period in which the sequence number reaches a maximum value and then returns to an initial value, and helps avoid a case in which different data packets carry a same sequence number. In another implementation, a sequence number may be transmitted as a context of the Ethernet frame, and the PE1 does not need to perform encapsulation on the Ethernet frame.

For example, the PE1 performs in-order replication on the upstream data packet that carries the control word, to obtain two same upstream data packets, which are used as an upstream data packet included in the first upstream service flow and an upstream data packet included in the fourth upstream service flow. The in-order replication means replicating packets one by one in an order of data packet receiving. If the first upstream service flow is the upstream service flow received by the PE1, the fourth upstream service flow is a service flow obtained by the PE1 by replicating the upstream service flow. If the fourth upstream service flow is the upstream service flow received by the PE1, the first upstream service flow is a service flow obtained by the PE1 by replicating the upstream service flow. As shown in FIG. 2, the first replicator 11 in the PE1 may be configured to replicate the received upstream service flow, to obtain the first upstream service flow and the fourth upstream service flow. The first replicator 11 sends the first upstream service flow to the first selector 12.

Optionally, the PE1 may further add Multiprotocol Label Switching (MPLS) encapsulation to an outer layer of the upstream data packet included in the first upstream service flow. The MPLS encapsulation may be encapsulating an MPLS LSP label and a PW label, or the MPLS encapsulation is encapsulating a PW label. The method provided in this embodiment of this application is described by using an example in which the MPLS encapsulation is encapsulating the PW label. For a manner in which the MPLS encapsulation is encapsulating the MPLS LSP label and the PW label, refer to a PW label encapsulation manner and a common MPLS LSP label encapsulation manner. No example is given for description in this embodiment of this application. As shown in FIG. 7, the PE1 may encapsulate, into an outer layer of a control word in the upstream data packet included in the first upstream service flow, a PW label corresponding to the PW13. The first replicator 11 or the first selector 12 may be configured to implement the foregoing MPLS encapsulation operation. Alternatively, the PE1 may add, into a context of the upstream data packet included in the first upstream service flow, a PW label corresponding to the PW13.

For example, the PE1 may obtain a sequence number in the following two manners: In one manner, the Ethernet frame received by the PE1 from the AC11 is an Ethernet frame of an IEEE802.1CB type, the Ethernet frame carries a sequence number, and the PE1 uses, as a sequence number in an upstream data packet to which the Ethernet frame belongs, the sequence number that is read from the Ethernet frame. The upstream data packet to which the Ethernet frame belongs is an upstream data packet that includes the Ethernet frame. In this way, same upstream data packets carry a same Ethernet frame, and same Ethernet frames carry a same sequence number. In this case, sequence numbers carried in same upstream data packets obtained by the PE1 and the PE2 are the same. In the foregoing manner, the PE1 may directly obtain the sequence number from the Ethernet frame received by using a pseudo wire. This helps simplify a processing procedure and improve packet processing efficiency. In the other manner, the PE1 may perform calculation by using a local algorithm and based on packet data in the Ethernet frame, to generate a sequence number. The local algorithm may be a hash algorithm. Packet data in same Ethernet frames obtained by the PE1 and the PE2 is the same, and the PE1 and the PE2 use a same algorithm. In this case, sequence numbers carried in same upstream data packets obtained by the PE1 and the PE2 are the same.

For example, the first upstream service flow includes at least a first upstream data packet. The first upstream data packet includes a first sequence number. The first sequence number is used to identify a sequence of the first upstream data packet in the first upstream service flow. Because the first upstream service flow is the upstream service flow received by the PE1 or is the service flow obtained by replicating the upstream service flow received by the PE1, the first sequence number indicates a sequence of the first upstream data packet in the upstream service flow received by the PE1. The first upstream data packet is any upstream data packet in the first upstream service flow. Similarly, each upstream data packet in the fourth upstream service flow carries a sequence number. The fourth upstream service flow also includes a first upstream data packet. The first upstream data packet included in the fourth upstream service flow is the same as the first upstream data packet in the first upstream service flow.

503. The PE1 sends the fourth upstream service flow to the PE2 by using the PW11.

As shown in FIG. 2, the first replicator 11 sends, by using the PW11, the obtained fourth upstream service flow to the third selector 22 included in the PE2.

Optionally, the PE1 may encapsulate, into an outer layer of a control word in the upstream data packet included in the fourth upstream service flow, a PW label corresponding to the PW11, in other words, use the encapsulation format shown in FIG. 7. The PE1 may send the fourth upstream service flow to the PE2 based on the PW label corresponding to the PW11. The PE1 may obtain an egress link by searching the following Table 1, to complete sending of the fourth upstream service flow. In another implementation, a PW label corresponding to the PW11 may be carried in a context of the upstream data packet in the fourth upstream service flow.

Optionally, the PE1 may store a correspondence between a first port and the PW label corresponding to the PW11. The first port is separately connected to the PW11 and the first replicator 11. Further, a second port included in the PE2 is connected to the PW11. The second port is further connected to the third selector 22, that is, the third selector 22 may receive the fourth upstream service flow from the PE1 by using the PW11. An operation in which the PE1 imposes, into the upstream data packet included in the fourth upstream service flow, a label corresponding to the PW11 may be completed by the first replicator 11 or the first port.

The port mentioned in this embodiment of this application is a logical port. A connection, between internal modules of a device, mentioned in this embodiment of this application means that a plurality of modules distributed on different ports are connected by using a logical channel forwarded by using an internal data plane of the device. A connection, between an internal module and a logical port, mentioned in this embodiment of this application means that a plurality of modules distributed on different ports and logical ports are connected by using a logical channel forwarded by using an internal data plane of a device. The foregoing connection may pass through switch fabric, a storage calculation unit, a logical chip, and a digital logical line. Further, the foregoing connection may be identified by using a logical line, or the foregoing logical connection may be identified by using a protocol field such as a VLAN or a label, to import a service flow to different modules.

Optionally, as shown in Table 1, the PE1 may store a mapping table. The mapping table that is stored in the PE1 and is shown in Table 1 includes static information used to represent a network topology structure. "AC11" in Table 1 represents an identifier used to identify the AC11. "PW" in the table represents a label used to identify a PW. For example, a form of "PW13" in Table 1 is the PW label corresponding to the PW13, a form of "PW11" in Table 1 is the PW label corresponding to the PW11, and a form of "PW12" in Table 1 is a PW label corresponding to the PW12.

TABLE 1

| Ingress link | Egress link | Protection link |
|---|---|---|
| AC11 | PW13 | PW11 |
| PW13 | AC11 | PW12 |

The ingress link in Table 1 is a link used for a service flow received by the PE1. The egress link in Table 1 is a link used for a service flow sent by the PE1. The protection link in Table 1 is a secondary link of the ingress link.

Optionally, as shown in Table 2, the PE1 may further store a status table. The status table that is stored in the PE1 and is shown in Table 2 includes dynamic information that is changed as each packet is output in a service flow sending process, and may be used to perform status detection and fault monitoring on a device, such as an incorrect ingress link or egress link and an abnormal reference sequence number. Example forms of "AC11", "PW13", "PW12", and "PW11" in Table 2 may also be same identifiers as those in Table 1.

TABLE 2

| Ingress link | Egress link | Reference sequence number |
| --- | --- | --- |
| AC11 or PW11 | PW13 | First reference sequence number |
| PW13 or PW12 | AC11 | Third reference sequence number |

The ingress link in Table 2 represents a link that a data packet including the reference sequence number is from. For example, an upstream data packet including the first reference sequence number may be from the AC11 or the PW11, and a downstream data packet including the third reference sequence number may be from the PW13 or the PW12. The egress link in Table 2 represents a link to which the data packet including the reference sequence number is sent. For example, the upstream data packet including the first reference sequence number may be sent to the PW13, and the downstream data packet including the third reference sequence number may be sent to the AC11. The first reference sequence number is a sequence number that is related to an upstream service flow and is configured on the PE1. The third reference sequence number is a sequence number that is related to a downstream service flow and is configured on the PE1.

504. The PE2 replicates the received upstream service flow, to obtain a second upstream service flow and a fifth upstream service flow.

For example, the PE2 receives, from the AC12, any Ethernet frame included in the upstream service flow sent by the CE1. The PE2 adds, to the any Ethernet frame on a port module (an ingress port module) connected to the AC12, an encapsulation header related to a sequence number. An encapsulation manner used by the PE2 is the same as the encapsulation manner used by the PE1 in step 502. A sequence number obtaining manner of the PE2 is the same as the sequence number obtaining manner of the PE1 in step 502. Details are not described herein again. In another implementation, the PE2 may use the manner in which a context carries a sequence number and that is used by the PE1, to add, into an upstream data packet in the second upstream service flow or an upstream data packet in the fifth upstream service flow, a sequence number corresponding to the Ethernet frame received from the AC12.

For example, the PE2 performs in-order replication on an upstream data packet that carries a control word and is obtained by the PE2, to obtain two same upstream data packets, which are used as the upstream data packet included in the second upstream service flow and the upstream data packet included in the fifth upstream service flow. If the second upstream service flow is the upstream service flow received by the PE2, the fifth upstream service flow is a service flow obtained by the PE2 by replicating the received upstream service flow. If the fifth upstream service flow is the upstream service flow received by the PE2, the second upstream service flow is a service flow obtained by the PE2 by replicating the received upstream service flow. As shown in FIG. 2, the third replicator 21 in the PE2 may be configured to replicate the upstream service flow received by the PE2, to obtain the second upstream service flow and the fifth upstream service flow. The third replicator 21 sends the fifth upstream service flow to the third selector 22.

Optionally, the PE2 may further add MPLS encapsulation to an outer layer of the upstream data packet included in the fifth upstream service flow. The MPLS encapsulation is the same as the corresponding content in step 502. Details are not described herein again. As shown in FIG. 7, the PE2 may encapsulate, into an outer layer of a control word in the upstream data packet included in the fifth upstream service flow, a PW label corresponding to the PW14. The third replicator 21 or the third selector 22 may be configured to implement the foregoing MPLS encapsulation operation.

For example, each upstream data packet in the second upstream service flow carries a sequence number. The second upstream service flow includes a second upstream data packet. The second upstream data packet includes a second sequence number. The second sequence number is used to identify a sequence of the second upstream data packet in the second upstream service flow. Because the second upstream service flow is the upstream service flow received by the PE2 or is the service flow obtained by replicating the upstream service flow received by the PE2, the second sequence number indicates a sequence of the second upstream data packet in the upstream service flow received by the PE2. The second upstream data packet is any upstream data packet in the second upstream service flow. Each upstream data packet in the fifth upstream service flow carries a sequence number. The fifth upstream service flow also includes a second upstream data packet. The second upstream data packet included in the fifth upstream service flow is the same as the second upstream data packet in the second upstream service flow.

Because upstream data packets included in the upstream service flow from the CE1 are sequentially and continuously sent to the PE1 and the PE2, and link lengths or transmission rates of the AC11 and the AC12 may not be totally the same, moments at which an initial upstream data packet in the upstream service flow arrives at the PE1 and the PE2 are not necessarily the same. For example, two copies of a data packet in the upstream service flow may be first received and processed by the PE1, or may be first received and processed by the PE2.

505. The PE2 sends the second upstream service flow to the PE1 by using the PW11.

As shown in FIG. 2, the third replicator 21 sends, by using the PW11, the obtained second upstream service flow to the first selector 12 included in the PE1.

Optionally, the PE2 may encapsulate, into an outer layer of a control word in the upstream data packet included in the second upstream service flow, a PW label corresponding to the PW11. The PE2 may send the second upstream service flow to the PE1 based on the PW label corresponding to the PW11. The PE2 may obtain an egress link by searching Table 3, to complete sending of the second upstream service flow.

Optionally, the PE2 may store a correspondence between a third port and the PW label corresponding to the PW11. The PW label that is corresponding to the PW11 and is used by the PE2 and the PW label that is corresponding to the PW11 and is used by the PE1 may be two unidirectional PW labels corresponding to the PW11. The third port is separately connected to the PW11 and the third replicator 21. The third port may be a same port as the second port, or may be a port different from the second port. A fourth port included in the PE1 is connected to the PW11. The fourth port is further connected to the first selector 12, that is, the first selector 12 may receive the second upstream service flow from the PE2 by using the PW11. The fourth port may be a same port as the first port in step 503, or may be a port different from the first port in step 503. The third replicator 21 imposes, into the second upstream service flow on the third port connected to the third replicator 21, a label corresponding to the PW11.

In the method provided in this embodiment of this application, the PW11 and the PW12 each are a bidirectional PW. Either the PW11 or the PW12 has a unique identifier. Two unidirectional PW labels are allocated to either the PW11 or the PW12. The two unidirectional PW labels are bound to one bidirectional PW. For example, in a process in which the PE1 and the PE2 transmit an upstream service flow by using the PW11, a PW label that is corresponding to the PW11 and is used by the PE2 and a PW label that is corresponding to the PW11 and is used by the PE1 are two unidirectional PW labels allocated to the PW11. Similarly, in a process in which the PE1 and the PE2 transmit a downstream service flow by using the PW12, a PW label that is corresponding to the PW12 and is used by the PE2 and a PW label that is corresponding to the PW12 and is used by the PE1 are two unidirectional PW labels allocated to the PW12.

Optionally, as shown in Table 3, the PE2 may store a mapping table. The mapping table that is stored in the PE2 and is shown in Table 3 includes static information used to represent a network topology structure. Example forms of "AC12", "PW11", "PW12", and "PW14" in Table 3 are the same as the forms in Table 1, and details are not described herein again.

TABLE 3

| Ingress link | Egress link | Protection link |
|---|---|---|
| AC12 | PW14 | PW11 |
| PW14 | AC12 | PW12 |

The ingress link in Table 3 is a link used for a service flow received by the PE2. The egress link in Table 3 is a link used for a service flow sent by the PE2. The protection link in Table 3 is a secondary link of the ingress link.

Optionally, as shown in Table 4, the PE2 may further store a status table. The status table that is stored in the PE2 and is shown in Table 4 includes dynamic information in a service flow sending process. Example forms of "AC12", "PW11", "PW12", and "PW14" in Table 4 are the same as the forms in Table 2, and details are not described herein again.

TABLE 4

| Ingress link | Egress link | Reference sequence number |
|---|---|---|
| AC12 or PW11 | PW14 | Second reference sequence number |
| PW14 or PW12 | AC12 | Fourth reference sequence number |

The ingress link in Table 4 represents a link that a data packet including the reference sequence number is from. For example, an upstream data packet including the second reference sequence number may be from the AC12 or the PW11, and a downstream data packet including the fourth reference sequence number may be from the PW14 or the PW12. The egress link in Table 4 represents a link to which the data packet including the reference sequence number is sent. For example, the upstream data packet including the second reference sequence number may be sent to the PW14, and the downstream data packet including the fourth reference sequence number may be sent to the AC12. The second reference sequence number is a sequence number that is related to an upstream service flow and is configured on the PE2. The fourth reference sequence number is a sequence number that is related to a downstream service flow and is configured on the PE2.

When no link and no node are faulty, and an upstream data packet sent by the CE1 and an upstream data packet obtained by replicating the upstream data packet sent by the CE1 are simultaneously received by the PE1 and the PE2, the PW11 between the PE1 and the PE2 prolongs a transmission time period. In this way, arrival time points and sequence numbers that are of the second upstream service flow and the first upstream service flow that are received by the first selector 12 in the PE1 are not totally the same. Similarly, arrival time points and sequence numbers that are of the fourth upstream service flow and the fifth upstream service flow that are received by the third selector 22 in the PE2 are not totally the same.

506. The PE1 obtains a third upstream service flow based on a first reference sequence number, the first upstream service flow, and the second upstream service flow, and sends the third upstream service flow.

For example, an initial value of the first reference sequence number may be 0. Each time the first selector 12 sends an upstream data packet, a value of the first reference sequence number is updated to a value of a sequence number included in the upstream data packet. Optionally, the PE1 may update content in an entry that includes the first reference sequence number in Table 2, update the ingress link to a link from which the upstream data packet is received, update the first reference sequence number to the sequence number included in the upstream data packet, and update the egress link to a link to which the upstream data packet is sent.

For example, that the PE1 obtains a third upstream service flow based on a first reference sequence number, the first upstream service flow, and the second upstream service flow includes the following steps: The PE1 sorts, based on an arrival moment of each upstream data packet in the first upstream service flow and an arrival moment of each upstream data packet in the second upstream service flow, the upstream data packet included in the first upstream service flow and the upstream data packet included in the second upstream service flow, to obtain a sorted upstream service flow. The PE1 selects, as the third upstream service flow from the sorted upstream service flow, a plurality of upstream data packets including sequence numbers whose values are greater than the first reference sequence number. A sequence number included in an $i^{th}$ upstream data packet in the third upstream service flow is greater than the first reference sequence number. An arrival moment of an $(i+1)^{th}$ upstream data packet in the third upstream service flow is later than an arrival moment of the $i^{th}$ upstream data packet. A sequence number included in the $(i+1)^{th}$ upstream data packet is greater than the sequence number included in the $i^{th}$ upstream data packet. The $i^{th}$ upstream data packet is any upstream data packet in the third upstream service flow.

When the second upstream service flow arrives at the first selector 12 later than the first upstream service flow, at least one upstream data packet included in the first upstream service flow may be sent by using the first selector 12. The second upstream service flow arrives at the first selector 12 at a moment t1. Before the moment t1, n−1 upstream data packets in the first upstream service flow are sent by the first selector 12, where n is an integer greater than 1. Before the moment t1, the last upstream data packet that is sent by the first selector 12 and belongs to the first upstream service flow is an $(n-1)^{th}$ upstream data packet. The first reference sequence number is updated to a sequence number included in the $(n-1)^{th}$ upstream data packet. The first upstream service flow further includes an $n^{th}$ upstream data packet and an $(n+1)^{th}$ upstream data packet. The $n^{th}$ upstream data packet represents an initial upstream data packet that is in the first upstream service flow and that arrives at the first selector 12 at the moment t1. The second upstream service flow includes an $m^{th}$ upstream data packet and an $(m+1)^{th}$ upstream data packet. The $m^{th}$ upstream data packet represents an initial upstream data packet that is in the second upstream service flow and that arrives at the first selector 12 at the moment t1, where m is an integer greater than 1.

In an implementation, the first selector 12 compares each of a sequence number included in the $m^{th}$ upstream data packet and a sequence number included in the $n^{th}$ upstream data packet with the sequence number included in the $(n-1)^{th}$ upstream data packet. Because both the second upstream service flow and the first upstream service flow are from a same upstream service flow, and the second upstream service flow arrives at the first selector 12 later than the first upstream service flow, the sequence number in the $m^{th}$ upstream data packet is less than or equal to the sequence number included in the $(n-1)^{th}$ upstream data packet. Because the $(n-1)^{th}$ upstream data packet is an upstream data packet that is before the $n^{th}$ upstream data packet in the first upstream service flow, the sequence number included in the $n^{th}$ upstream data packet is greater than the sequence number included in the $(n-1)^{th}$ upstream data packet. The first selector 12 uses the $n^{th}$ upstream data packet as an upstream data packet in the third upstream service flow based on the foregoing comparison result. The first selector 12 may update the first reference sequence number to the sequence number included in the $n^{th}$ upstream data packet. The first selector 12 may continue to use the foregoing method to compare each of a sequence number included in the $(n+1)^{th}$ upstream data packet, a sequence number included in the $(m+1)^{th}$ upstream data packet, and the sequence number included in the $m^{th}$ upstream data packet with the sequence number included in the $n^{th}$ upstream data packet, to determine that the sequence number included in the $(n+1)^{th}$ upstream data packet is greater than the updated first reference sequence number. The first selector 12 uses the $(n+1)^{th}$ upstream data packet as the upstream data packet in the third upstream service flow.

In another implementation, the first selector 12 may sort the $n^{th}$ upstream data packet, the $(n+1)^{th}$ upstream data packet, the $m^{th}$ upstream data packet, and the $(m+1)^{th}$ upstream data packet based on arrival moments of the four upstream data packets, to obtain a sorted upstream service flow. The sorted upstream service flow is arranged as follows in ascending order of arrival moments: the $m^{th}$ upstream data packet→the $n^{th}$ upstream data packet→the $(m+1)^{th}$ upstream data packet→the $(n+1)^{th}$ upstream data packet. When the $m^{th}$ upstream data packet is an initial packet in the second upstream service flow, and the first upstream service flow and the second upstream service flow are from a same upstream service flow, a sequence number included in the $m^{th}$ upstream data packet is less than or equal to the sequence number included in the $(n-1)^{th}$ upstream data packet. After obtaining the sorted upstream service flow, the first selector 12 compares, with the first reference sequence number, a sequence number included in the upstream data packet included in the sorted upstream service flow. The first selector 12 determines that the sequence number included in the $m^{th}$ upstream data packet is less than or equal to the sequence number included in the $(n-1)^{th}$ upstream data packet, and the first selector 12 determines that an upstream data packet that is the same as the $m^{th}$ upstream data packet has been sent. In this case, the first selector 12 may discard the $m^{th}$ upstream data packet. The first selector 12 compares, in ascending order of arrival moments of upstream data packets in the sorted upstream service flow, a sequence number included in the $n^{th}$ upstream data packet with the sequence number included in the $(n-1)^{th}$ upstream data packet. The sequence number included in the $n^{th}$ upstream data packet is greater than the sequence number included in the $(n-1)^{th}$ upstream data packet, and the first selector 12 determines that the $n^{th}$ upstream data packet belongs to the third upstream service flow.

The first selector 12 updates the first reference sequence number to the sequence number included in the $n^{th}$ upstream data packet. The first selector 12 continues to compare the sequence number included in the $n^{th}$ upstream data packet with a sequence number included in the $(m+1)^{th}$ upstream data packet. If the sequence number included in the $(m+1)^{th}$ upstream data packet is greater than the sequence number included in the $n^{th}$ upstream data packet, the first selector 12 determines that the $(m+1)^{th}$ upstream data packet belongs to the third upstream service flow, and updates the first reference sequence number by using the sequence number included in the $(m+1)^{th}$ upstream data packet. The value of the updated first reference sequence number is the sequence number included in the $(m+1)^{th}$ upstream data packet. If the sequence number included in the $(m+1)^{th}$ upstream data packet is less than or equal to the sequence number included in the $n^{th}$ upstream data packet, the first selector 12 discards the $(m+1)^{th}$ upstream data packet. The value of the first reference sequence number is the sequence number included in the $n^{th}$ upstream data packet. The first selector 12 compares a sequence number in the $(n+1)^{th}$ upstream data packet with the first reference sequence number. When the sequence number in the $(n+1)^{th}$ upstream data packet is greater than the first reference sequence number, the first selector 12 determines that the $(n+1)^{th}$ upstream data packet belongs to the third upstream service flow. The first selector 12 updates the first reference sequence number by using the sequence number in the $(n+1)^{th}$ upstream data packet.

Based on the foregoing method, the third upstream service flow obtained by the first selector 12 may be as follows: the $n^{th}$ upstream data packet→the $(m+1)^{th}$ upstream data packet→the $(n+1)^{th}$ upstream data packet. Alternatively, the third upstream service flow is as follows: the $n^{th}$ upstream data packet→the $(n+1)^{th}$ upstream data packet. Alternatively, the third upstream service flow is as follows: the $n^{th}$ upstream data packet→the $(m+1)^{th}$ upstream data packet.

Particularly, when the AC1 is faulty or service congestion occurs on the PE1 and then a service is recovered, and the second upstream service flow arrives at the first selector 12 earlier than the first upstream service flow, at least one upstream data packet in the second upstream service flow is sent by the first selector 12, and the first selector 12 may obtain the third upstream service flow with reference to the foregoing method. The third upstream service flow may be as follows: the $m^{th}$ upstream data packet→the $(m+1)^{th}$ upstream data packet→the $(n+1)^{th}$ upstream data packet. Alternatively, the third upstream service flow is as follows: the $m^{th}$ upstream data packet→the $(m+1)^{th}$ upstream data packet. Alternatively, the third upstream service flow is as follows: the $m^{th}$ upstream data packet→the $(n+1)^{th}$ upstream data packet.

The PE1 may send the third upstream service flow to a next hop. The next hop is a network device, on an LSP of an upstream service flow, that is connected to the PE1 and that is closer to a destination node of the upstream service flow. The next hop may be an intermediate node that can transparently transmit the third upstream service flow, for example, a provider (P) device. In the embodiment in FIG. 2, if there is no P device, the next hop of the PE1 is the PE3.

Optionally, before sending the third upstream service flow, the PE1 may perform label swapping or label imposition on each upstream data packet included in the third upstream service flow. When the upstream data packet in the third upstream service flow includes a PW label, the PE1 may swap the PW label included in the upstream data packet in the third upstream service flow with the PW label corresponding to the PW13. When the upstream data packet in the third upstream service flow includes no PW label, the PE1 may obtain a label of the next hop by using Table 1, namely, the PW label corresponding to the PW13. The PE1 encapsulates the MPLS label of the next hop into an outer layer of a control word, to obtain the upstream data packet shown in FIG. 7. The foregoing label imposition or swapping operation may be implemented by the first selector 12.

Optionally, the first selector 12 is further connected to a fifth port, and the fifth port is connected to the PW13. The PE1 pre-stores a correspondence between the fifth port and the label of the next hop. The first selector 12 may obtain the label of the next hop based on the fifth port connected to the first selector 12. In another implementation, the foregoing action of imposing the label of the next hop may be implemented by a module or a component that implements MPLS encapsulation and that is between the first selector 12 and the fifth port. No example is given for description herein.

507. The PE2 obtains a sixth upstream service flow based on a second reference sequence number, the fourth upstream service flow, and the fifth upstream service flow, and sends the sixth upstream service flow.

For example, an initial value of the second reference sequence number may be 0. Each time the third selector 22 sends an upstream data packet, a value of the second reference sequence number is updated to a value of a sequence number included in the upstream data packet. Optionally, the PE2 may update content in an entry that includes the second reference sequence number in Table 4, update the ingress link to a link from which the upstream data packet is received, update the second reference sequence number to the sequence number included in the upstream data packet, and update the egress link to a link to which the upstream data packet is sent.

A method in which the PE2 obtains the sixth upstream service flow based on the second reference sequence number, the fourth upstream service flow, and the fifth upstream service flow is the same as the foregoing method in which the PE1 obtains the third upstream service flow. Details are not described herein again.

When the fourth upstream service flow arrives at the third selector 22 later than the fifth upstream service flow, at least one upstream data packet included in the fifth upstream service flow may be sent by using the third selector 22. The fourth upstream service flow arrives at the third selector 22 at a moment t2. Before the moment t2, m−1 upstream data packets in the fifth upstream service flow are sent by the third selector 22, where m is an integer greater than 1. Before the moment t2, the last upstream data packet that is sent by the third selector 22 and belongs to the fifth upstream service flow is an $(m-1)^{th}$ upstream data packet. The second reference sequence number is updated to a sequence number included in the $(m-1)^{th}$ upstream data packet. The fifth upstream service flow further includes an $m^{th}$ upstream data packet and an $(m+1)^{th}$ upstream data packet. The $m^{th}$ upstream data packet represents an initial upstream data packet that is in the fifth upstream service flow and that arrives at the third selector 22 at the moment t2. The fourth upstream service flow includes an $n^{th}$ upstream data packet and an $(n+1)^{th}$ upstream data packet. The $n^{th}$ upstream data packet represents an initial upstream data packet that is in the fourth upstream service flow and that arrives at the third selector 22 at the moment t2, where n is an integer greater than 1.

The third selector 22 may obtain the sixth upstream service flow by using the method used by the first selector 12 in step 506. The sixth upstream service flow may be as follows: the $m^{th}$ upstream data packet→the $(m+1)^{th}$ upstream data packet→the $(n+1)^{th}$ upstream data packet. Alternatively, the sixth upstream service flow is as follows: the $m^{th}$ upstream data packet→the $(m+1)^{th}$ upstream data packet. Alternatively, the sixth upstream service flow is as follows: the $m^{th}$ upstream data packet→the $(n+1)^{th}$ upstream data packet.

When the fourth upstream service flow arrives at the third selector 22 earlier than the fifth upstream service flow, at least one upstream data packet in the fourth upstream service flow is sent by the third selector 22, and the third selector 22 may obtain the sixth upstream service flow with reference to the foregoing method. The sixth upstream service flow may be as follows: the $n^{th}$ upstream data packet→the $(m+1)^{th}$ upstream data packet→the $(n+1)^{th}$ upstream data packet. Alternatively, the sixth upstream service flow is as follows: the $n^{th}$ upstream data packet→the $(n+1)^{th}$ upstream data packet. Alternatively, the sixth upstream service flow is as follows: the $n^{th}$ upstream data packet→the $(m+1)^{th}$ upstream data packet.

The PE2 may send the sixth upstream service flow to a next hop. The next hop is a network device, on an LSP of an upstream service flow, that is connected to the PE2 and that is closer to a destination node of the upstream service flow. The next hop may be an intermediate node that can transparently transmit the sixth upstream service flow, for example, a P device. In the embodiment in FIG. 2, if there is no P device, the next hop of the PE2 is the PE4.

Optionally, before sending the sixth upstream service flow, the PE2 may perform label imposition or label swapping on each upstream data packet included in the sixth upstream service flow. For a method, refer to the label processing method executed by the PE1. Different from the label processing method executed by the PE1, a label used by the PE2 is the PW label corresponding to the PW14. The PE2 may obtain a label of the next hop by using Table 3, namely, the PW label corresponding to the PW14. The foregoing label imposition or swapping operation may be implemented by the third selector 22.

Optionally, the third selector 22 is further connected to a sixth port, and the sixth port is connected to the PW14. The PE2 pre-stores a correspondence between the sixth port and the label of the next hop. The third selector 22 may obtain the label of the next hop based on the sixth port connected to the third selector 22. In another implementation, the foregoing action of imposing the label of the next hop may be implemented by a module or a component that is used to implement MPLS encapsulation and that is between the third selector 22 and the sixth port. No example is given for description herein.

Step 501 to step 507 describe a method for processing an upstream service flow. The third upstream service flow obtained by the PE1 and the sixth upstream service flow obtained by the PE2 may be totally the same, or may not be totally the same. For example, one upstream service flow is a subset of the other upstream service flow, or one upstream service flow and the other upstream service flow include a same upstream data packet or different upstream data packets. In step 501 to step 507, provided that step 502 and step 505 are performed before step 506 and that step 503 and step 504 are performed before step 507, an execution sequence of step 502, step 503, step 504, and step 505 is not limited to the sequence in FIG. 5A. Step 502 and step 504 may be performed simultaneously, or step 504 is performed before step 502. Step 503 and step 505 may be performed simultaneously, or step 505 is performed before step 503.

Further, for a downstream service flow from the CE2 to the CE1, step 508 to step 513 provide a method for processing a downstream service flow. The following describes the method for processing a downstream service flow. For a similar part, refer to the method for processing an upstream service flow.

508. The PE1 obtains a first downstream service flow and a fourth downstream service flow based on a downstream service flow sent by the PE3.

A method in which the PE1 obtains the first downstream service flow and the fourth downstream service flow is the same as that in step 502. The second replicator 13 in the PE1 is configured to replicate the downstream service flow sent by the PE3. One downstream service flow in the first downstream service flow and the fourth downstream service flow is the downstream service flow from the PE3, and the other downstream service flow is a service flow obtained by replicating the downstream service flow from the PE3.

509. The PE1 sends the fourth downstream service flow to the PE2 by using a PW12.

As shown in FIG. 2, the second replicator 13 sends, by using the PW12, the obtained fourth downstream service flow to the fourth selector 24 included in the PE2. The PW12 is used to transmit a service flow in a downstream communication direction between the PE1 and the PE2, in other words, transmit a downstream service flow.

Optionally, the PE1 may perform MPLS encapsulation on a downstream data packet included in the fourth downstream service flow. For example, the PE1 swaps a PW label in the downstream data packet included in the fourth downstream service flow with the PW label corresponding to the PW12. The PE1 may send the fourth downstream service flow to the PE2 based on the PW label corresponding to the PW12. The PE1 may obtain, from Table 1, the PW label corresponding to the PW12. The second replicator 13 included in the PE1 or an egress port module connected to the second replicator 13 may be configured to implement the foregoing MPLS encapsulation.

510. The PE2 obtains a second downstream service flow and a fifth downstream service flow based on a downstream service flow sent by the PE4.

For example, the fourth replicator 23 included in the PE2 may replicate the downstream service flow by using a same method as the third replicator 21, to obtain the second downstream service flow and the fifth downstream service flow. One downstream service flow in the second downstream service flow and the fifth downstream service flow is the downstream service flow sent by the PE4, and the other downstream service flow is a service flow obtained by replicating the downstream service flow sent by the PE4.

The downstream service flow sent by the PE4 and the downstream service flow sent by the PE3 may be a totally same downstream service flow, or may be downstream service flows that are not totally the same. In the method for processing a downstream service flow in this embodiment of this application, the method for processing a downstream service flow is described based on a case in which the downstream service flow sent by the PE4 and the downstream service flow sent by the PE3 are totally the same. For a case in which the downstream service flow sent by the PE4 and the downstream service flow sent by the PE3 are not totally the same, refer to a sequence number comparison method provided in this embodiment of this application to perform a selection and/or discard operation. Examples are not given one by one herein for description.

511. The PE2 sends the second downstream service flow to the PE1 by using the PW12.

A method in which the fourth replicator 23 in the PE2 sends the second downstream service flow to the PE1 by using the PW12 is the same as the method in which the second replicator 13 in the PE1 sends the fourth downstream service flow to the PE2 by using the PW12. Details are not described herein again.

A method in which the fourth replicator 23 performs MPLS encapsulation on a downstream data packet included in the second downstream service flow may be the same as the MPLS encapsulation method used by the second replicator 13. Details are not described herein again.

512. The PE1 obtains a third downstream service flow based on a third reference sequence number, the first downstream service flow, and the second downstream service flow, and sends the third downstream service flow.

The third reference sequence number is a sequence number that is related to a downstream service flow. The third reference sequence number may be updated based on a sequence number included in a downstream data packet sent by the PE1 and then recorded in Table 2. For a method in which the PE1 obtains the third downstream service flow based on the third reference sequence number, refer to the method in which the PE1 obtains the third upstream service flow. A function of the second selector 14 in the PE1 is the same as a function of the first selector 12 in the PE1. A difference lies in that the second selector 14 is configured to process a downstream service flow and the first selector 12 is configured to process an upstream service flow.

For example, the PE1 may send the third downstream service flow to the CE1 by using the AC11, that is, the second selector 14 may send the third downstream service flow to the CE1 by using a port that is on the PE1 and is connected to the AC11. On a port module connected to the AC11, the PE1 may further remove MPLS encapsulation and a control word that are included in the third downstream service flow, to obtain a downstream Ethernet frame and sent the frame by using the AC11.

513. The PE2 obtains a sixth downstream service flow based on a fourth reference sequence number, the fourth downstream service flow, and the fifth downstream service flow, and sends the sixth downstream service flow.

The fourth reference sequence number is a sequence number that is related to a downstream service flow. The fourth reference sequence number may be updated based on a sequence number included in a downstream data packet sent by the PE2. For a method in which the PE2 obtains the sixth downstream service flow based on the fourth reference sequence number, refer to the method in which the PE2 obtains the sixth upstream service flow. A function of the fourth selector 24 in the PE2 is the same as a function of the third selector 22 in the PE2. A difference lies in that the fourth selector 24 is configured to process a downstream service flow and the third selector 22 is configured to process an upstream service flow.

For example, the PE2 may send the sixth downstream service flow to the CE1 by using the AC12, that is, the fourth selector 24 may send the sixth downstream service flow to the CE1 by using a port that is on the PE2 and is connected to the AC12. On a port module connected to the AC12, the PE2 may further remove MPLS encapsulation and a control word that are included in the sixth downstream service flow, to obtain a downstream Ethernet frame and sent the frame by using the AC12.

In step 508 to step 513, the third downstream service flow and the sixth downstream service flow may be two service flows that are totally the same, or may be two service flows that are not totally the same. For example, one downstream service flow is a subset of the other downstream service flow, or one downstream service flow and the other downstream service flow include at least one same downstream data packet. In step 508 to step 513, provided that step 508 and step 511 are performed before step 512 and that step 509 and step 510 are performed before step 513, an execution sequence of step 508, step 509, step 510, and step 511 is not limited to the sequence in FIG. 5B. Step 508 and step 510 may be performed simultaneously, or step 510 is performed before step 508. Step 509 and step 511 may be performed simultaneously, or step 511 is performed before step 509.

In the method provided in Embodiment 1 of this application, the PE1 and the PE2 are protected by using two PWs, and use a method for replicating a service flow, selecting a service flow based on a sequence number, and sending the service flow, to perform high-reliability service protection on a service flow transmitted between the CE1 and the CE2. In addition, a service can be protected from being affected by a single point of failure or even a specific multipoint failure in the network, without a need to perform coordination between fault detection and a switching action by any device in the PE1, the PE2, the CE1, and the CE2, such that network reliability of the service is higher than that in a previous protection technology. In addition, in the method, protocol complexity brought when a conventional technology based on automatic protection switching is used is avoided, and the method is easier to implement on a high-speed network device, such that scalability of an MPLS network can be improved.

Figure 3:
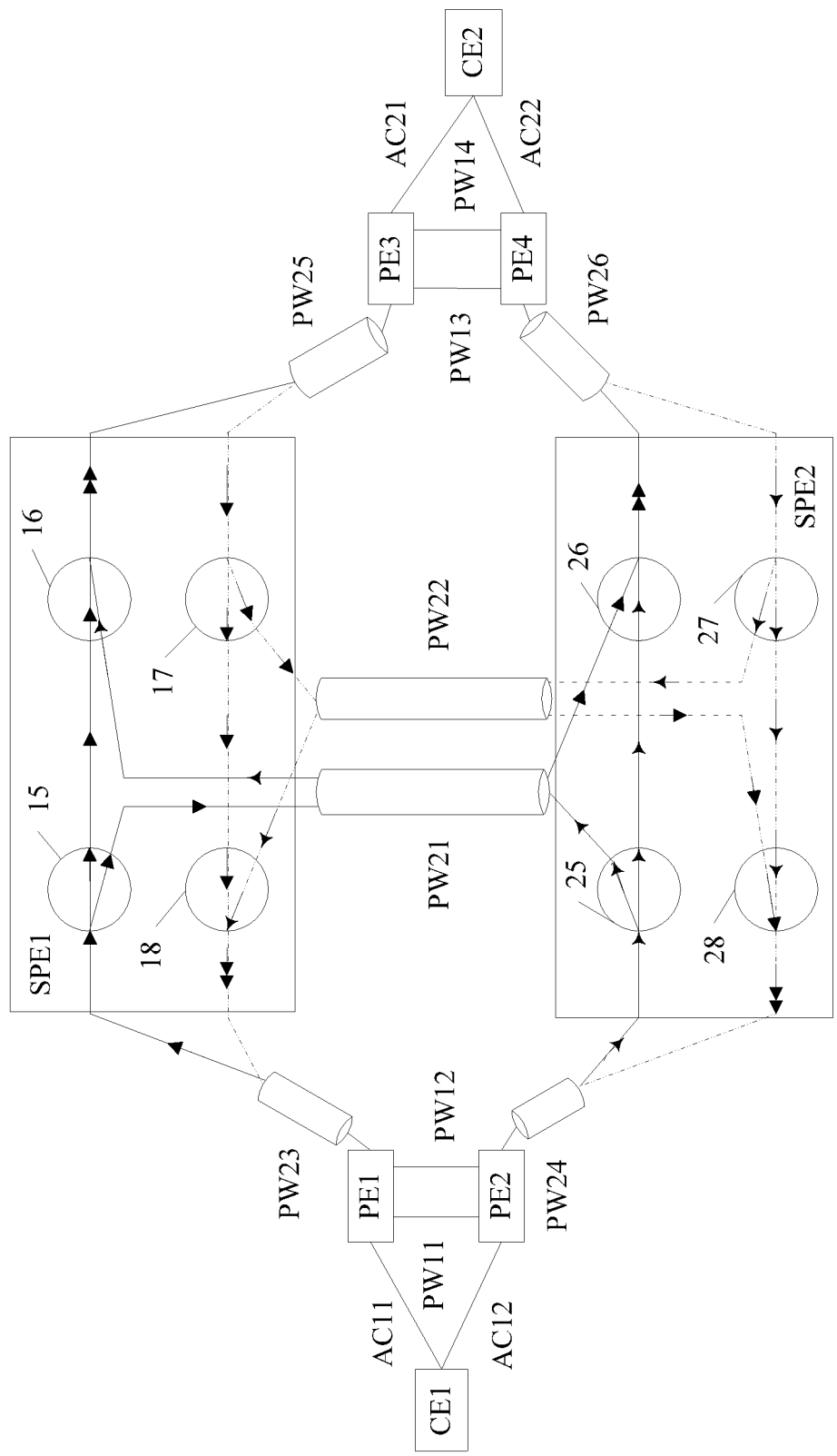
FIG. 3 is a schematic diagram of a second network scenario according to an embodiment of this application.

FIG. 3 is a schematic diagram of a second network scenario according to an embodiment of this application. As shown in FIG. 3, corresponding devices in the first network scenario may be used for a PE1, a PE2, and a CE1 that are included in the second network scenario provided in this embodiment of this application. Connections among the PE1, the PE2, and the CE1 in the second network scenario are the same as those in the first network scenario. Details are not described herein again. A manner in which the PE1 and the PE2 process an upstream service flow and a downstream service flow in the second network scenario is the same as that in the first network scenario. For details, refer to the corresponding content in step 501 to step 513. A structure and a function of a PE3 in the second network scenario may be the same as those of the PE1. A structure and a function of a PE4 in the second network scenario may be the same as those of the PE2. A PW13 is used for upstream communication between the PE3 and the PE4. A function and a structure of the PW13 are the same as those of a PW11. A PW14 is used for downstream communication between the PE3 and the PE4. A function and a structure of the PW14 are the same as those of a PW12. For a method in which the PE3 and the PE4 cooperate to process a service flow, refer to the method in which the PE1 and the PE2 cooperate to process a service flow, namely, the corresponding content in step 501 to step 513. Details are not described herein again. An SPE1 and an SPE2 form a network device group in the second network scenario. In addition, the PE1 and the PE2 may form a network device group in the second network scenario, and the PE3 and the PE4 may form another network device group in the second network scenario.

As shown in FIG. 3, the SPE1 communicates with the PE1 by using a PW23, and communicates with the PE3 by using a PW25. The SPE2 communicates with the PE2 by using a PW24, and communicates with the PE4 by using a PW26. The SPE1 communicates with the SPE2 by using a PW21 and a PW22. The PW21 is used to protect a service flow in upstream communication between the SPE1 and the SPE2, in other words, is used to transmit an upstream service flow. The PW22 is used to protect a service flow in downstream communication between the SPE1 and the SPE2, in other words, is used to transmit a downstream service flow.

For example, a function of a replicator 15 included in the SPE1 is similar to a function of a first replicator 11 included in the PE1. A difference includes the following: The replicator 15 included in the SPE1 is configured to replicate an upstream service flow from the PE1, and send, to the SPE2 by using the PW21, the upstream service flow from the PE1 or a service flow obtained by replicating the upstream service flow sent by the PE1. When the PE1 belongs to another network device group, the SPE1 does not need to add, to an upstream data packet from the PE1, a control word and a PW label corresponding to the PW21, and the SPE1 may perform, based on the PW label corresponding to the PW21, a swapping operation on a PW label included in the received upstream data packet. When the PE1 does not belong to any network device group, and an upstream data packet sent by the PE1 to the SPE1 includes no control word and no PW label, the SPE1 may use a method used by the PE1, to obtain a sequence number and obtain an upstream data packet that carries a control word and a PW label corresponding to the PW21. A function of a selector 16 included in the SPE1 is the same as a function of a first selector 12 included in the PE1. A difference lies in that the selector 16 included in the SPE1 further needs to perform, on an egress port module, a PW label swapping operation on an upstream service flow to be sent to the PE3, to ensure that each upstream data packet sent by the selector 16 included in the SPE1 carries a PW label corresponding to the PW25. A function of a replicator 17 included in the SPE1 is the same as a function of a second replicator 13 included in the PE1. A difference lies in that the replicator 17 included in the SPE1 sends, to the SPE2 by using the PW22, a downstream service flow from the PE3 or a service flow obtained by replicating a downstream service flow sent by the PE3. A function of a selector 18 included in the SPE1 is the same as a function of a second selector 14 included in the PE1. A difference lies in that the selector 18 included in the SPE1 further needs to perform, on an egress port module, a label swapping operation on a downstream service flow to be sent to the PE1, and does not need to perform an operation of removing a control word and a PW label from a downstream data packet to be sent to the PE1, to ensure that each downstream data packet sent by the selector 18 included in the SPE1 carries a PW label corresponding to the PW23. For a method in which the SPE1 processes the upstream service flow sent by the PE1, refer to the method in which the PE1 processes an upstream service flow sent by the CE1. For a method in which the SPE1 processes the downstream service flow sent by the PE3, refer to the method in which the PE1 processes a downstream service flow sent by the PE3. Details are not described herein again.

For example, a function of a replicator 25 included in the SPE2 is the same as a function of a third replicator 21 included in the PE2. A difference includes the following: The replicator 25 included in the SPE2 is configured to replicate an upstream service flow from the PE2, and send, to the SPE1 by using the PW21, the upstream service flow from the PE2 or a service flow obtained by replicating the upstream service flow sent by the PE2. When the PE2 belongs to another network device group, the SPE2 does not need to add, to an upstream data packet from the PE2, a control word and a PW label corresponding to the PW21, and the SPE2 may perform, based on the PW label corresponding to the PW21, a swapping operation on a PW label included in the received upstream data packet. When the PE2 does not belong to any network device group, and an upstream data packet sent by the PE2 to the SPE2 includes no control word and no PW label, the SPE2 may use a method used by the PE2, to obtain a sequence number and obtain an upstream data packet that carries a control word and a PW label corresponding to the PW21. A function of a selector 26 included in the SPE2 is the same as a function of a third selector 22 included in the PE2. A difference lies in that the selector 26 included in the SPE2 further needs to perform, on an egress port module, a label swapping operation on an upstream service flow to be sent to the PE4, to ensure that each upstream data packet sent by the selector 26 included in the SPE2 carries a PW label corresponding to the PW26. A function of a replicator 27 included in the SPE2 is the same as a function of a fourth replicator 23 included in the PE2. A difference lies in that the replicator 27 included in the SPE2 sends, to the SPE1 by using the PW22, a downstream service flow from the PE4 or a service flow obtained by replicating a downstream service flow sent by the PE4. A function of a selector 28 included in the SPE2 is the same as a function of a fourth selector 24 included in the PE2. A difference lies in that the selector 28 included in the SPE2 needs to perform, on an egress port module, a label swapping operation on a downstream service flow to be sent to the PE2, and does not need to perform an operation of removing a control word and a PW label from a downstream data packet to be sent to the PE2, to ensure that each downstream data packet sent by the selector 28 included in the SPE2 carries a PW label corresponding to the PW24. For a method in which the SPE2 processes the upstream service flow sent by the PE2, refer to the method in which the PE2 processes an upstream service flow sent by the CE1. For a method in which the SPE2 processes the downstream service flow sent by the PE4, refer to the method in which the PE2 processes a downstream service flow sent by the PE4. Details are not described herein again.

In the second network scenario provided in this embodiment of this application, a structure similar to that in FIG. 2 is deployed between the SPE1 and the SPE2, to help further improve path redundancy between two PEs, for example, a link between the PE1 and the PE3 and a link between the PE2 and the PE4, such that service reliability in a service flow transmission process is increased. In the second network scenario, each network node uses the structure shown in FIG. 2 or FIG. 3, in other words, uses a grid-shaped dual PW connection manner, such that a service exception caused by a single point of failure and a specific multipoint failure in a network can be avoided.

Figure 4:
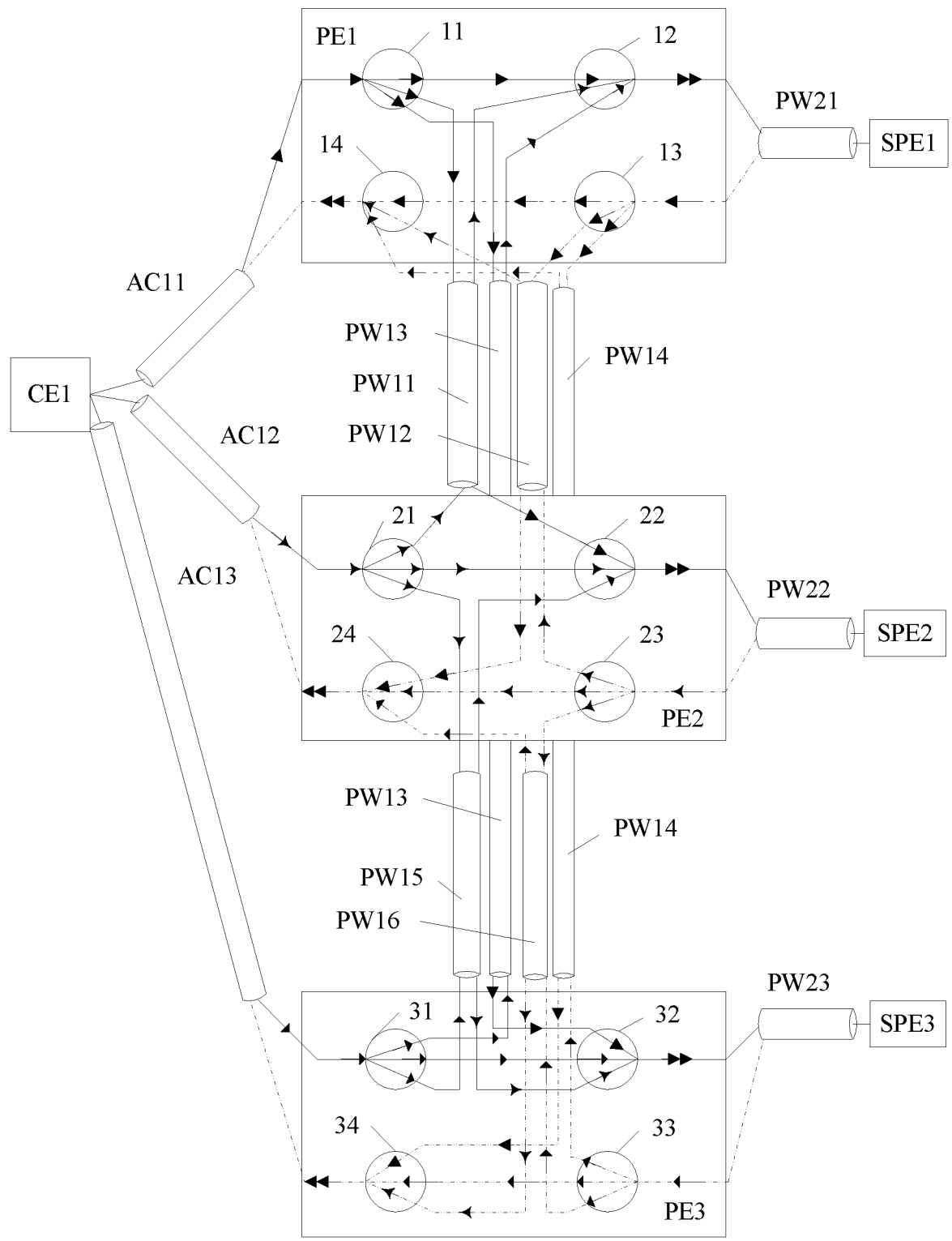
FIG. 4 is a schematic diagram of a third network scenario according to an embodiment of this application.

FIG. 4 is a schematic diagram of a third network scenario according to an embodiment of this application. A PE1, a PE2, and a PE3 form a network device group in the third network scenario. An SPE1, an SPE2, and an SPE3 may form another network device group in the third network scenario. A connection relationship between two network devices included in the network device group in the third network scenario and functions thereof are the same as those in the network device group in the first network scenario. A connection relationship between the PE1 and a CE1, a connection relationship between the PE1 and the PE2, and a connection relationship between the PE2 and the CE1 are the same as those in the first network scenario. As shown in FIG. 4, the PE1 may communicate with the PE3 by using a PW13 and a PW14. The PW13 is used for upstream communication between the PE1 and the PE3. The PW14 is used for downstream communication between the PE1 and the PE3. The PE1 may communicate with the SPE1 by using a PW21. The PE2 may communicate with the PE3 by using a PW15 and a PW16. The PW15 is used for upstream communication between the PE2 and the PE3. The PW16 is used for downstream communication between the PE2 and the PE3. The PE2 may communicate with the SPE2 by using a PW22. The PE3 may communicate with the SPE3 by using a PW23. In another network scenario, the SPE1, the SPE2, and the SPE3 may be replaced with PE devices, and the network scenario is not further described herein. For an embodiment in which the SPE1, the SPE2, and the SPE3 are used as a network device group, refer to an embodiment in which the PE1, the PE2, and the PE3 are used as a network device group. A structure included in each of the PE1 and the PE2 is the same as a corresponding device in the first network scenario. The PE3 includes a fifth replicator 31, a fifth selector 32, a sixth replicator 33, and a sixth selector 34. The fifth replicator 31 and the fifth selector 32 are configured to process an upstream service flow. The sixth replicator 33 and the sixth selector 34 are configured to process a downstream service flow.

Figure 6A:
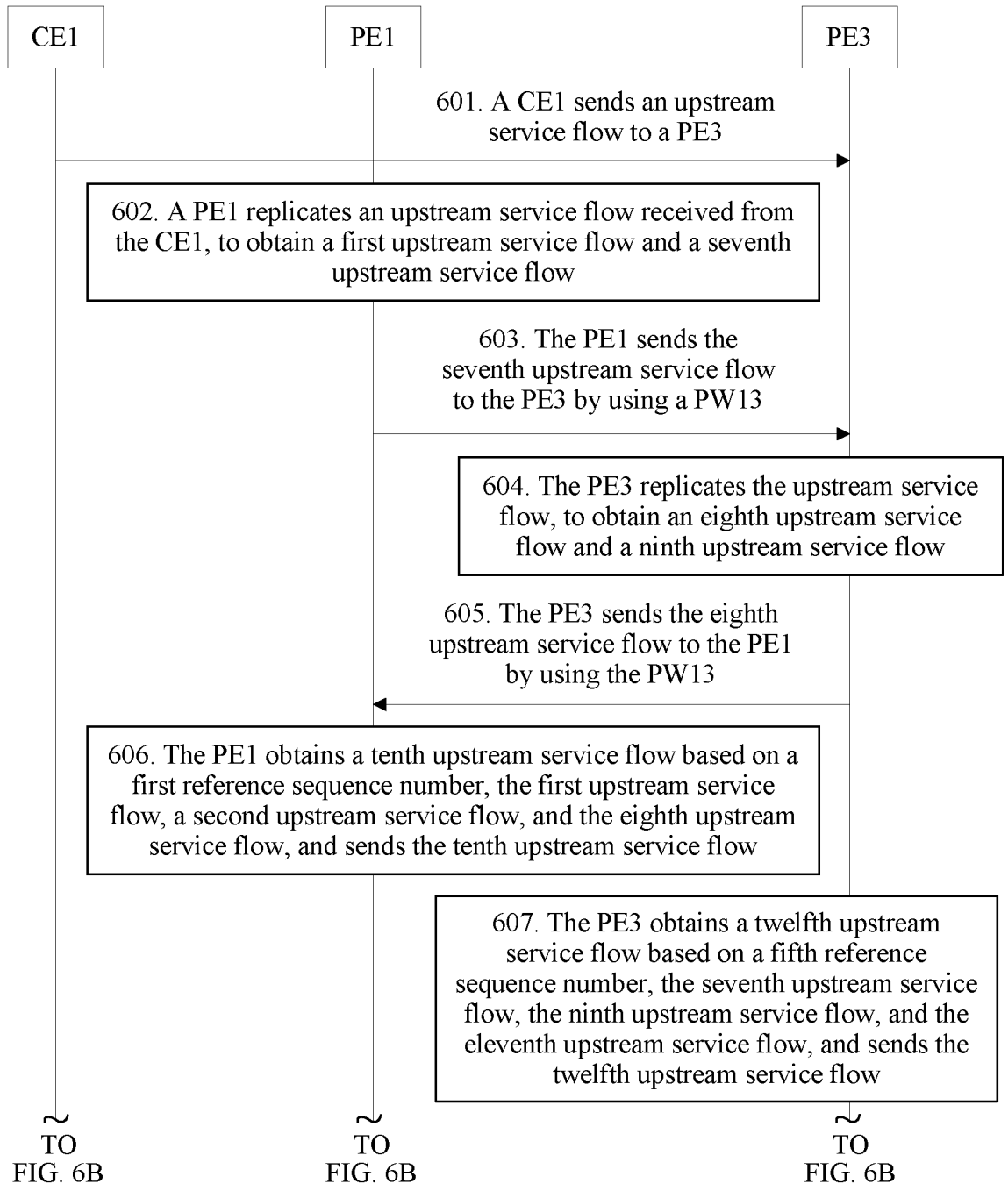
FIG. 6A and FIG. 6B are flowcharts of a method for processing a service flow in a packet network according to Embodiment 2 of this application.
Figure 6B:
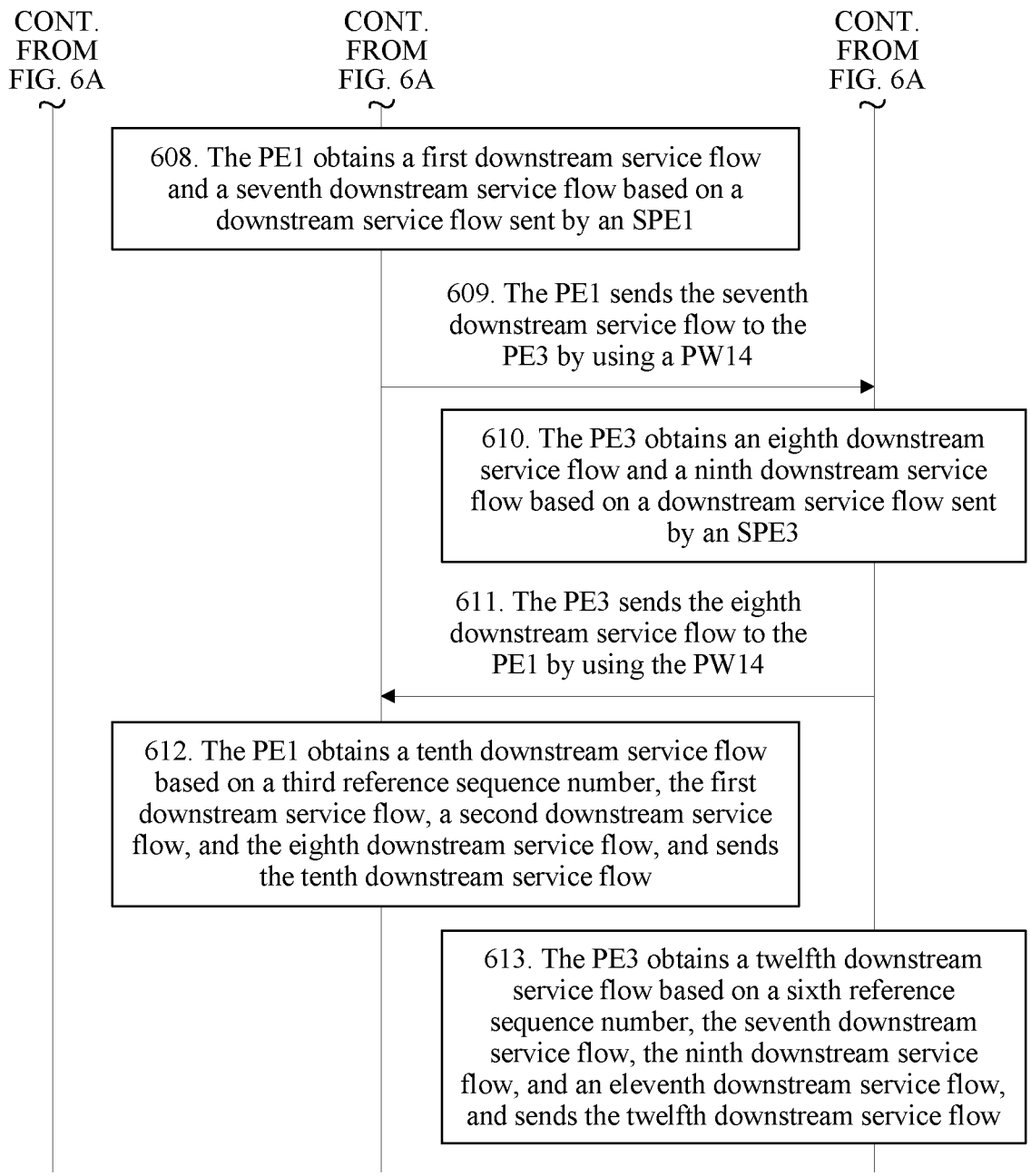

FIG. 6A and FIG. 6B are flowcharts of a method for processing a service flow in a packet network according to Embodiment 2 of this application. The method for processing a service flow in a packet network provided in Embodiment 2 of this application may include the content in steps 501 to 513 in the method provided in Embodiment 1, namely, an interaction procedure among the PE1, the PE2, and the CE1. The foregoing content is not described again in Embodiment 2. With reference to FIG. 4, the following describes an interaction procedure that is among the PE3, the PE1, and the CE1 and is included in the method provided in Embodiment 2 of this application.

601. The CE1 sends an upstream service flow to the PE3.

For example, step 601 and step 501 in Embodiment 1 of this application may be performed simultaneously, that is, the CE1 may replicate an upstream service flow to obtain three upstream service flows. The three upstream service flows include two upstream service flows obtained through replication. The CE1 sends the three upstream service flows respectively to the PE1, the PE2, and the PE3. For example, the CE1 may send the upstream service flow to the PE3 by using an AC13.

602. The PE1 replicates an upstream service flow received from the CE1, to obtain a first upstream service flow and a seventh upstream service flow.

For example, the PE1 may replicate the upstream service flow from the CE1 by using the method in step 501 in Embodiment 1 of this application, to obtain the seventh upstream service flow. The first upstream service flow is the same as the first upstream service flow in Embodiment 1 of this application. If the first upstream service flow is the upstream service flow received by the PE1, the seventh upstream service flow is a service flow obtained by the PE1 by replicating the upstream service flow. If the seventh upstream service flow is the upstream service flow received by the PE1, the first upstream service flow is a service flow obtained by the PE1 by replicating the upstream service flow. As shown in FIG. 4, a first replicator 11 in the PE1 sends the first service flow to a first selector 12. For a method in which the PE1 obtains a sequence number and encapsulates a control word into an Ethernet frame received from an AC11, refer to the method used by the PE1 in the embodiment corresponding to FIG. 5A and FIG. 5B. Details are not described herein again.

For example, each upstream data packet in the seventh upstream service flow carries a sequence number. The seventh upstream service flow also includes a first upstream data packet included in the first upstream service flow in step 502. The first upstream data packet included in the seventh upstream service flow is the same as the first upstream data packet in the first upstream service flow.

603. The PE1 sends the seventh upstream service flow to the PE3 by using the PW13.

As shown in FIG. 4, the first replicator 11 sends, by using the PW13, the obtained seventh upstream service flow to the fifth selector 32 included in the PE3. For a method, refer to the method in which the first replicator 11 sends the fourth upstream service flow to the third selector 22 in step 503.

Optionally, the PE1 may perform MPLS encapsulation on a downstream data packet included in the seventh downstream service flow. For example, the PE1 may impose, into the downstream data packet included in the seventh downstream service flow, a PW label corresponding to the PW13. The PE1 may send the seventh upstream service flow to the PE3 by using the PW13 and based on the PW label corresponding to the PW13. For a method, refer to the corresponding content in step 503.

604. The PE3 replicates the received upstream service flow, to obtain an eighth upstream service flow and a ninth upstream service flow.

For example, the PE3 performs in-order replication on any upstream data packet included in the upstream service flow received by the PE3, to obtain two same upstream data packets, which are used as an upstream data packet included in the eighth upstream service flow and an upstream data packet included in the ninth upstream service flow. For details, refer to the method in which the PE2 obtains the second upstream service flow and the fifth upstream service flow in step 504. As shown in FIG. 4, the fifth replicator 31 in the PE3 may be configured to replicate the upstream service flow received by the PE3, to obtain the eighth service flow and the ninth service flow. The fifth replicator 31 sends the ninth service flow to the fifth selector 32. For a method in which the PE3 obtains a sequence number and encapsulates a control word into an Ethernet frame received from the AC13, refer to the method used by the PE1 in the embodiment corresponding to FIG. 5A and FIG. 5B. Details are not described herein again.

Because upstream data packets included in the upstream service flow are sequentially and continuously sent to the PE1, the PE2, and the PE3, and structures of the AC11, an AC12, and the AC13 are not totally the same, moments at which an initial upstream data packet in the upstream service flow arrives at the PE1, the PE2, and the PE3 are not necessarily the same. For example, the upstream service flow is first received and processed by the PE1, or the upstream service flow is first received and processed by the PE2, or the upstream service flow is first received and processed by the PE3.

605. The PE3 sends the eighth upstream service flow to the PE1 by using the PW13.

As shown in FIG. 4, the fifth replicator 31 sends, by using the PW13, the obtained eighth upstream service flow to the first selector 12 included in the PE1.

Optionally, the PE3 may perform MPLS encapsulation on the downstream data packet included in the eighth downstream service flow. For example, the PE3 may impose, into the downstream data packet included in the eighth downstream service flow, a PW label corresponding to the PW13. The PE3 may send the eighth upstream service flow to the PE1 by using the PW13 and based on the PW label corresponding to the PW13. For a method, refer to the procedure in which the PE2 performs encapsulation in step 505.

When the upstream service flow sent by the CE1 is simultaneously received by the PE1 and the PE3, the PW13 between the PE1 and the PE3 prolongs a transmission time period. In this way, the eighth upstream service flow and the first upstream service flow that are received by the first selector 12 in the PE1 may not be totally the same. Similarly, the seventh upstream service flow and the ninth upstream service flow that are received by the fifth selector 32 in the PE3 may not be totally the same.

606. The PE1 obtains a tenth upstream service flow based on a first reference sequence number, the first upstream service flow, a second upstream service flow, and the eighth upstream service flow, and sends the tenth upstream service flow.

The first reference sequence number in Embodiment 2 of this application is the same as the first reference sequence number in Embodiment 1, and an update method of the first reference sequence number in Embodiment 2 is the same as the update method in Embodiment 1. The second upstream service flow may be an upstream service flow that is obtained by the PE2 by using the method in Embodiment 1 and that is sent by the PE2 to the PE1.

For example, a method in which the PE1 obtains the tenth upstream service flow based on the first reference sequence number is the same as the method in which the PE1 obtains the third upstream service flow in Embodiment 1. A difference lies in that the PE1 in Embodiment 2 needs to sort and/or perform screening on the three received upstream service flows, that is, sort and/or perform screening on the received first upstream service flow, second upstream service flow, and eighth upstream service flow. For a sorting and/or screening method used by the PE1, refer to step 506 in Embodiment 1. Details are not described herein again.

For example, a next hop of the PE1 is the SPE1 in FIG. 4. A method in which the PE1 sends the tenth upstream service flow to the SPE1 is the same as the method in which the PE1 sends the third upstream service flow in Embodiment 1. A difference lies in that a PW label encapsulated by the PE1 into each upstream data packet in the tenth upstream service flow is a PW label corresponding to the PW21. Whether the tenth upstream service flow in Embodiment 2 is the same as the third upstream service flow in Embodiment 1 depends on an upstream data packet selected in a process of performing sequence-number-based screening on the first upstream service flow, the second upstream service flow, and the eighth service flow. In other words, the tenth upstream service flow may be the same as the third upstream service flow, or may be different from the third upstream service flow.

607. The PE3 obtains a twelfth upstream service flow based on a fifth reference sequence number, the seventh upstream service flow, the ninth upstream service flow, and an eleventh upstream service flow, and sends the twelfth upstream service flow.

An initial value of the fifth reference sequence number in Embodiment 2 may be 0. For an update method of the fifth reference sequence number, refer to the update method in Embodiment 1. Details are not described herein again. The eleventh upstream service flow is an upstream service flow obtained by the PE2 when obtaining the second upstream service flow. The eleventh upstream service flow is the same as the second upstream service flow in Embodiment 1. The eleventh upstream service flow may be an upstream service flow received by the PE2 from the CE1, or may be a service flow obtained by replicating an upstream service flow received by the PE2 from the CE1.

For example, for a method in which the PE3 obtains the twelfth upstream service flow based on the fifth reference sequence number, refer to the method in which the PE2 obtains the sixth upstream service flow in Embodiment 1. A difference lies in that the PE3 in Embodiment 2 sorts and/or performs screening on the three received upstream service flows, that is, sorts and/or performs screening on the received seventh upstream service flow, ninth upstream service flow, and eleventh upstream service flow. For a sorting and/or screening method used by the PE3, refer to step 507 in Embodiment 1. Details are not described herein again.

For example, a next hop of the PE3 is the SPE3 in FIG. 4. A method in which the PE3 sends the twelfth upstream service flow to the SPE3 is the same as the method in which the PE2 sends the sixth upstream service flow in Embodiment 1. A difference lies in that a PW label encapsulated by the PE3 into each upstream data packet in the twelfth upstream service flow is a PW label corresponding to the PW23. Whether the twelfth upstream service flow in Embodiment 2 is the same as the sixth upstream service flow in Embodiment 1 depends on an upstream data packet selected in a process of performing sequence-number-based screening on the seventh upstream service flow, the ninth upstream service flow, and the eleventh service flow. In other words, the twelfth upstream service flow may be the same as the sixth upstream service flow, or may be different from the sixth upstream service flow.

Step 601 to step 607 describe a method for processing an upstream service flow. In step 601 to step 607, provided that step 602 and step 605 are performed before step 606 and that step 603 and step 604 are performed before step 607, an execution sequence of step 602, step 603, step 604, and step 605 is not limited to the sequence in FIG. 6A. Step 602 and step 604 may be performed simultaneously, or step 604 is performed before step 602. Step 603 and step 605 may be performed simultaneously, or step 605 is performed before step 603.

Step 608 to step 613 describe a method for processing a downstream service flow. The following describes the method for processing a downstream service flow. For a similar part, refer to the method for processing an upstream service flow.

608. The PE1 obtains a first downstream service flow and a seventh downstream service flow based on a downstream service flow sent by the SPE1.

For a method in which the PE1 obtains the seventh downstream service flow, refer to step 602. A second replicator 13 in the PE1 is configured to replicate the downstream service flow sent by the SPE1, to obtain the seventh downstream service flow. The seventh downstream service flow may be the downstream service flow from the SPE1, or may be a service flow obtained by replicating the downstream service flow from the SPE1.

609. The PE1 sends the seventh downstream service flow to the PE3 by using the PW14.

As shown in FIG. 4, the second replicator 13 sends, by using the PW14, the obtained seventh downstream service flow to the sixth selector 34 included in the PE3.

Optionally, the PE1 may perform MPLS encapsulation on a downstream data packet included in the seventh downstream service flow. For a method, refer to the method in which the PE1 performs encapsulation on the downstream data packet included in the fourth downstream service flow. A difference is that the PE1 encapsulates, into the downstream data packet included in the seventh downstream service flow, a PW label corresponding to the PW14. The PE1 may send the seventh downstream service flow to the PE3 by using the PW14 and based on the PW label corresponding to the PW14. For a method, refer to step 603.

610. The PE3 obtains an eighth downstream service flow and a ninth downstream service flow based on a downstream service flow sent by the SPE3.

For example, the sixth replicator 33 included in the PE3 may replicate the downstream service flow by using a same method as the fifth replicator 31, to obtain the eighth downstream service flow and the ninth downstream service flow.

The downstream service flow sent by the SPE3 and the downstream service flow sent by the SPE1 may be a totally same downstream service flow, or may be downstream service flows that are not totally the same. In the method for processing a downstream service flow in this embodiment of this application, the method for processing a downstream service flow is described based on a case in which the downstream service flow sent by the SPE3 and the downstream service flow sent by the SPE1 are totally the same. For a case in which the downstream service flow sent by the SPE3 and the downstream service flow sent by the SPE1 are not totally the same, refer to a sequence number comparison method provided in this embodiment of this application to perform a selection and/or discard operation. Examples are not given one by one herein for description.

611. The PE3 sends the eighth downstream service flow to the PE1 by using the PW14.

A method in which the sixth replicator 33 in the PE3 sends the eighth downstream service flow to the PE1 by using the PW14 is the same as the method in which the second replicator 13 in the PE1 sends the seventh downstream service flow to the PE3 by using the PW14. Details are not described herein again.

A method in which the sixth replicator 33 performs MPLS encapsulation on a downstream data packet included in the eighth downstream service flow may be the same as the MPLS encapsulation method used by the second replicator 13. Details are not described herein again. A difference is that the PE3 encapsulates, into the downstream data packet included in the eighth downstream service flow, a PW label corresponding to the PW14. The PE3 may send the eighth downstream service flow to the PE1 by using the PW14 and based on the PW label corresponding to the PW14.

612. The PE1 obtains a tenth downstream service flow based on a third reference sequence number, the first downstream service flow, a second downstream service flow, and the eighth downstream service flow, and sends the tenth downstream service flow.

The third reference sequence number in Embodiment 2 is the same as the third reference sequence number in Embodiment 1. An update method of the third reference sequence number in Embodiment 2 is the same as the update method in Embodiment 1. A method in which the PE1 obtains the tenth downstream service flow in Embodiment 2 is the same as the method in which the PE1 obtains the tenth upstream service flow in Embodiment 2. A difference lies in that the third reference sequence number is used when the PE1 in Embodiment 2 obtains the tenth downstream service flow while the first reference sequence number is used when the PE1 obtains the tenth upstream service flow.

For example, the PE1 may send the tenth downstream service flow to the CE1 by using the AC11, that is, a second selector 14 may send the tenth downstream service flow to the CE1 by using a port that is on the PE1 and is connected to the AC11. Optionally, before sending the tenth downstream service flow to the CE1, the PE1 may remove a control word and a PW label from each downstream data packet included in the tenth downstream service flow.

613. The PE3 obtains a twelfth downstream service flow based on a sixth reference sequence number, the seventh downstream service flow, the ninth downstream service flow, and an eleventh downstream service flow, and sends the twelfth downstream service flow.

The sixth reference sequence number is a sequence number that is related to a downstream service flow and is on the PE3. The sixth reference sequence number may be updated based on a sequence number included in a downstream data packet sent by the PE3. For a method in which the PE3 obtains the twelfth downstream service flow based on the sixth reference sequence number, refer to the method in which the PE3 obtains the twelfth upstream service flow. A function of the sixth selector 34 in the PE3 is the same as a function of the fifth selector 32 in the PE3. A difference lies in that the sixth selector 34 is configured to process a downstream service flow and the fifth selector 32 is configured to process an upstream service flow.

For example, the PE3 may send the twelfth downstream service flow to the CE1 by using the AC13, that is, the sixth selector 34 may send the twelfth downstream service flow to the CE1 by using a port that is on the PE3 and is connected to the AC13. Optionally, before sending the twelfth downstream service flow to the CE1, the PE3 may remove a control word and a PW label from each downstream data packet included in the twelfth downstream service flow.

In step 608 to step 613, provided that step 608 and step 611 are performed before step 612 and that step 609 and step 610 are performed before step 613, an execution sequence of step 608, step 609, step 610, and step 611 is not limited to the sequence in FIG. 6B. Step 608 and step 610 may be performed simultaneously, or step 610 is performed before step 608. Step 609 and step 611 may be performed simultaneously, or step 611 is performed before step 609.

For an interaction procedure among the PE2, the PE3, and the CE1 in FIG. 4, refer to the interaction procedure among the PE3, the PE1, and the CE1. Details are not described again in the method provided in Embodiment 2 of this application.

In the method provided in Embodiment 2 of this application, three PE devices form a network device group, and any two PE devices in the network device group can perform reliability protection on a received upstream service flow or downstream service flow. Compared with the method provided in Embodiment 1, stability and reliability are further improved.

Figure 8:
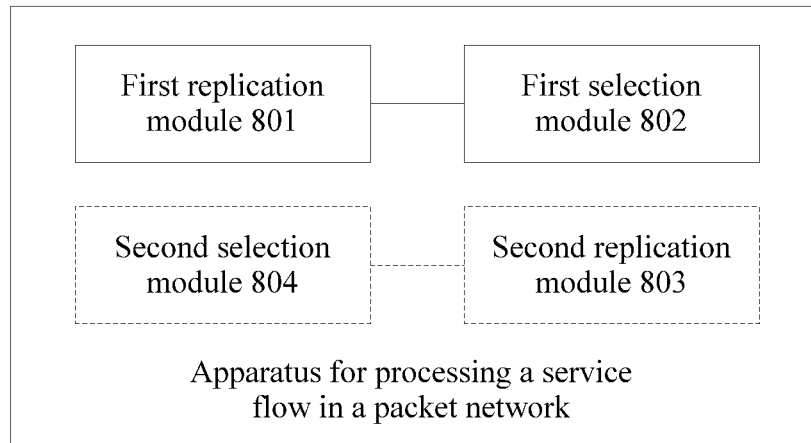
FIG. 8 is a schematic structural diagram of an apparatus for processing a service flow in a packet network according to an embodiment of this application.

FIG. 8 is a schematic structural diagram of an apparatus for processing a service flow in a packet network according to an embodiment of this application. The apparatus shown in FIG. 8 may be any device in a network device group provided in this embodiment of this application, for example, the PE1, the PE2, the SPE1, the SPE2, or the PE3 in the foregoing method. The apparatus provided in this embodiment of this application includes a first replication module 801 and a first selection module 802. When the apparatus is the PE1, the first replication module 801 may be the first replicator 11, and the first selection module 802 may be the first selector 12. When the apparatus is the PE2, the first replication module 801 may be the third replicator 21, and the first selection module 802 may be the third selector 22. In this embodiment of this application, an example in which the apparatus is disposed in a first network device included in the network device group is used for description. The network device group further includes a second network device, the first network device is connected to the second network device, the first network device communicates with a third network device, and the second network device communicates with a fourth network device.

The first replication module 801 is configured to obtain a first upstream service flow. The first upstream service flow includes at least one upstream data packet. Each upstream data packet in the first upstream service flow includes a sequence number. The sequence number included in each upstream data packet in the first upstream service flow is used to identify a sequence that is in the first upstream service flow and that is of the upstream data packet including the sequence number. The first upstream service flow is an upstream service flow received by the first network device from the third network device, or is a service flow obtained by the first network device by replicating an upstream service flow from the third network device.

The first selection module 802 is configured to receive a second upstream service flow sent by the second network device. The second upstream service flow includes at least one upstream data packet. Each upstream data packet in the second upstream service flow includes a sequence number. The sequence number included in each upstream data packet in the second upstream service flow is used to identify a sequence that is in the second upstream service flow and that is of the upstream data packet including the sequence number. The second upstream service flow is an upstream service flow received by the second network device from the fourth network device, or is a service flow obtained by the second network device by replicating an upstream service flow from the fourth network device.

The first selection module 802 is configured to obtain a third upstream service flow based on a first reference sequence number and a sequence number included in each upstream data packet in N received upstream service flows. The third upstream service flow includes at least one upstream data packet. The N upstream service flows include the first upstream service flow and the second upstream service flow. A sequence number included in any upstream data packet in the third upstream service flow is greater than the first reference sequence number.

The first selection module 802 is configured to send the third upstream service flow to a fifth network device.

Optionally, the first replication module 801 is further configured to: receive an upstream service flow from the third network device, and replicate the upstream service flow from the third network device; and send a fourth upstream service flow to the second network device by using the first pseudo wire. The fourth upstream service flow is the upstream service flow from the third network device, or is a service flow obtained by replicating the upstream service flow from the third network device.

Optionally, the apparatus further includes a second replication module 803 and a second selection module 804. When the apparatus is the PE1, the second replication module 803 may be the second replicator 13, and the second selection module 804 may be the second selector 14. When the apparatus is the PE2, the second replication module 803 may be the fourth replicator 23, and the second selection module 804 may be the fourth selector 24.

The second replication module 803 is further configured to obtain a first downstream service flow. The first downstream service flow includes at least one downstream data packet. Each downstream data packet in the first downstream service flow includes a sequence number. The sequence number included in each downstream data packet in the first downstream service flow is used to identify a sequence that is in the first downstream service flow and that is of the downstream data packet including the sequence number. The first downstream service flow is a downstream service flow received by the first network device from the fifth network device, or is a service flow obtained by the first network device by replicating a downstream service flow from the fifth network device.

The second selection module 804 is configured to receive, by using a second pseudo wire, a second downstream service flow sent by the second network device. The second downstream service flow includes at least one downstream data packet. Each downstream data packet in the second downstream service flow includes a sequence number. The sequence number included in each downstream data packet in the second downstream service flow is used to identify a sequence that is in the second downstream service flow and that is of the downstream data packet including the sequence number. The second downstream service flow is a downstream service flow received by the second network device from a sixth network device, or is a service flow obtained by the second network device by replicating a downstream service flow from a sixth network device.

The second selection module 804 is further configured to obtain a third downstream service flow based on a second reference sequence number and a sequence number included in each downstream data packet in M received downstream service flows. The M downstream service flows include the first downstream service flow and the second downstream service flow. The third downstream service flow includes at least one downstream data packet. A sequence number included in any downstream data packet in the third downstream service flow is greater than the second reference sequence number.

The second selection module 804 is further configured to send the third downstream service flow to the third network device.

Optionally, the second replication module 803 is further configured to: receive a downstream service flow from the fifth network device, and replicate the downstream service flow from the fifth network device; and send a fourth downstream service flow to the second network device by using the second pseudo wire. The fourth downstream service flow is the downstream service flow from the fifth network device, or is a service flow obtained by replicating the downstream service flow from the fifth network device.

For example, the first selection module 802 is configured to select, as the third upstream service flow based on the sequence number included in each upstream data packet in the first upstream service flow and the sequence number included in each upstream data packet in the second upstream service flow, a plurality of upstream data packets including sequence numbers whose values are greater than the first reference sequence number. An $i^{th}$ upstream data packet is any upstream data packet in the third upstream service flow. A sequence number included in the $i^{th}$ upstream data packet is greater than the first reference sequence number. A sequence number included in a $(i+1)^{th}$ upstream data packet is greater than the sequence number included in the $i^{th}$ upstream data packet. The $(i+1)^{th}$ upstream data packet follows the $i^{th}$ upstream data packet in the third upstream service flow.

For example, the first selection module 802 is configured to: sort, based on an arrival moment of each upstream data packet in the first upstream service flow and an arrival moment of each upstream data packet in the second upstream service flow, the upstream data packet included in the first upstream service flow and the upstream data packet included in the second upstream service flow, to obtain a sorted upstream service flow; and select, as the third upstream service flow from the sorted upstream service flow, a plurality of upstream data packets including sequence numbers whose values are greater than the first reference sequence number. A sequence number included in an $i^{th}$ upstream data packet in the third upstream service flow is greater than the first reference sequence number. An arrival moment of an $(i+1)^{th}$ upstream data packet in the third upstream service flow is later than an arrival moment of the $i^{th}$ upstream data packet. A sequence number included in the $(i+1)^{th}$ upstream data packet is greater than the sequence number included in the $i^{th}$ upstream data packet. The $i^{th}$ upstream data packet is any upstream data packet in the third upstream service flow.

For example, the second selection module 804 is configured to select, as the third downstream service flow based on the sequence number included in each downstream data packet in the first downstream service flow and the sequence number included in each downstream data packet in the second downstream service flow, a plurality of downstream data packets including sequence numbers whose values are greater than the second reference sequence number. A $j^{th}$ downstream data packet is any downstream data packet in the third downstream service flow. A sequence number included in the $j^{th}$ downstream data packet is greater than the second reference sequence number. A sequence number included in a $(j+1)^{th}$ downstream data packet is greater than the sequence number included in the $j^{th}$ downstream data packet. The $(j+1)^{th}$ downstream data packet follows the $j^{th}$ downstream data packet in the third downstream service flow.

For example, the second selection module 804 is configured to: sort, based on an arrival moment of each downstream data packet in the first downstream service flow and an arrival moment of each downstream data packet in the second downstream service flow, the downstream data packet included in the first downstream service flow and the downstream data packet included in the second downstream service flow, to obtain a sorted downstream service flow; and select, as the third downstream service flow from the sorted downstream service flow, a plurality of downstream data packets including sequence numbers whose values are greater than the second reference sequence number. A sequence number included in a $j^{th}$ downstream data packet in the third downstream service flow is greater than the second reference sequence number. An arrival moment of a $(j+1)^{th}$ downstream data packet in the third downstream service flow is later than an arrival moment of the $j^{th}$ downstream data packet. A sequence number included in the $(j+1)^{th}$ downstream data packet is greater than the sequence number included in the $j^{th}$ downstream data packet. The $j^{th}$ downstream data packet is any downstream data packet in the third downstream service flow.

Optionally, the first selection module 802 is further configured to update a value of the first reference sequence number by using a maximum value of a sequence number included in the upstream data packet in the third upstream service flow.

Optionally, the second selection module 804 is further configured to update a value of the second reference sequence number by using a maximum value of a sequence number included in the downstream data packet in the third downstream service flow.

Optionally, the first replication module 801 and/or the second replication module 803 may be disposed in a receiving processing logical module of a physical port of the apparatus. The first selection module 802 and the second selection module 804 may be disposed in a sending processing logical module of the physical port of the apparatus.

Optionally, when the first network device is a PE device and the third network device is a CE device, the first replication module 801 is configured to: receive an Ethernet frame from the third network device; obtain a sequence number based on the Ethernet frame; and obtain, based on the Ethernet frame and the sequence number, an upstream data packet included in the first upstream service flow. The upstream data packet includes the Ethernet frame and the sequence number.

The first replication module 801 may be configured to perform calculation on the received Ethernet frame, to obtain the sequence number. Alternatively, the first replication module 801 may be configured to obtain, from the Ethernet frame, a sequence number carried in the Ethernet frame.

In another implementation, the first replication module 801 may further include a sequence number generation module (not shown in FIG. 8). The sequence number generation module may generate a sequence number when an Ethernet frame is received, such that the first replication module 801 adds, into the upstream data packet in the first upstream service flow, the sequence number generated by the sequence number generation module. Optionally, the sequence number generation module may be implemented by a sequence number generator.

Figure 9:
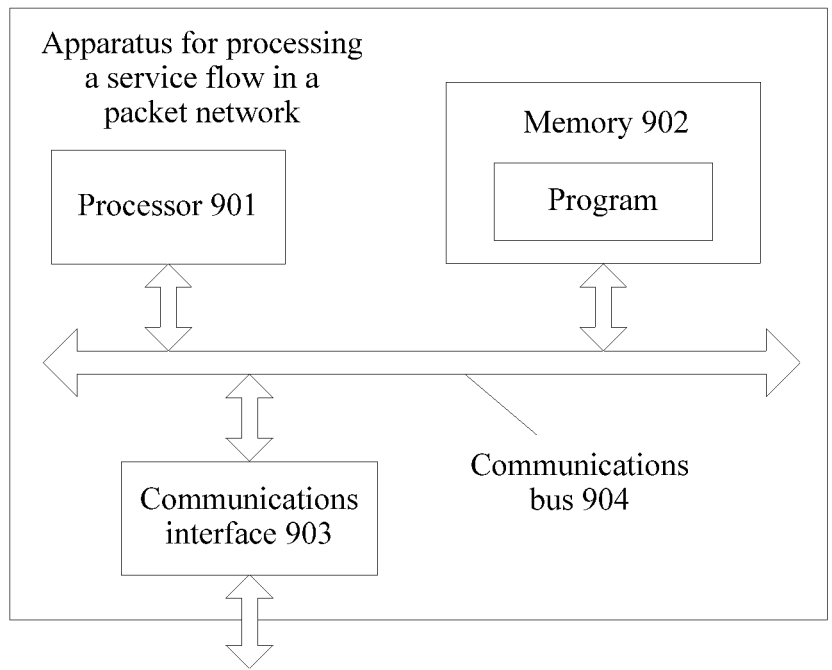
FIG. 9 is a schematic structural diagram of another apparatus for processing a service flow in a packet network according to an embodiment of this application.

FIG. 9 is a schematic structural diagram of another apparatus for processing a service flow in a packet network according to an embodiment of this application. The apparatus shown in FIG. 9 may be the same as the apparatus shown in FIG. 8. The apparatus shown in FIG. 9 may be any device included in a network device group in the network scenario shown in FIG. 2, FIG. 3, or FIG. 4. The apparatus in this embodiment may execute a method used by any PE in the embodiment corresponding to FIG. 5A and FIG. 5B or FIG. 6A and FIG. 6B. The apparatus provided in this embodiment includes a processor 901, a memory 902, and a communications interface 903. The processor 901, the memory 902, and the communications interface 903 are connected by using a communications bus 904. The memory 902 is configured to store a program. The processor 901 executes, based on an executable instruction included in the program that is read from the memory 902, steps in the method executed by any PE in the embodiment corresponding to FIG. 5A and FIG. 5B or FIG. 6A and FIG. 6B.

For example, the processor 901 is configured to implement a replication function and a selection function that are of any PE in the embodiment corresponding to FIG. 5A and FIG. 5B or FIG. 6A and FIG. 6B. The processor 901 may send/receive an upstream data packet and/or a downstream data packet by using the communications interface 903. Optionally, the memory 902 may further be configured to store a mapping table and a status table in the embodiment corresponding to FIG. 5A and FIG. 5B or FIG. 6A and FIG. 6B.

An embodiment of this application further provides a system for processing a service flow in a packet network. The system may include a network device group in the foregoing method. Any device included in the network device group may use the structure in FIG. 8 or FIG. 9. Details are not described herein again.

According to the foregoing method and apparatus provided in the embodiments of this application, any device in a network device group may further impose, based on a forwarding requirement and the encapsulation format shown in FIG. 7, an MPLS LSP label used to instruct forwarding. A method for imposing an MPLS LSP label is not described in detail herein again. In addition, configuration of the network device group and that of a PW between network device groups mentioned in the embodiments of this application may be completed before the method in FIG. 5A and FIG. 5B or FIG. 6A and FIG. 6B is executed. Configuration information or a forwarding entry that is in a response may be delivered, such that any device in FIG. 2, FIG. 3, or FIG. 4 learns of a protection link and a protection device that are corresponding to the device. Details are not described in the embodiments of this application.

The general purpose processor mentioned in the embodiments of this application may be a microprocessor or the processor may be any conventional processor. The steps in the methods disclosed with reference to the embodiments of the present disclosure may be directly performed by using a combination of hardware in the processor and a software module. When software is used for implementation, code that implements the foregoing functions may be stored in a computer readable medium. The computer readable medium includes a computer storage medium. The storage medium may be any available medium that can be accessed by a computer. The following is used as an example but imposes no limitation: The computer readable medium may be a random-access memory (RAM), a read-only memory (ROM), an electrically erasable programmable read-only memory (EEPROM), a compact disc read-only memory (CD-ROM) or another compact disc storage, a disk storage medium or another disk storage device, or any other medium that can be used to carry or store expected program code in an instruction or data structure form and that can be accessed by the computer. The computer readable medium may be a compact disc (CD), a laser disc, a digital video disc (DVD), a floppy disk, or a Blu-ray disc.

The embodiments in this specification are all described in a progressive manner. For same or similar parts in the embodiments, refer to these embodiments. Each embodiment focuses on a difference from other embodiments. Especially, the system embodiment is basically similar to the method embodiment, and therefore is described briefly. For related parts, refer to partial descriptions in the method embodiment.

The foregoing descriptions are only example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing a service flow and implemented by a first network device in a packet network, the method comprising:

obtaining a first upstream service flow comprising first upstream data packets comprising first sequence numbers identifying a sequence of the first upstream data packets in the first upstream service flow, wherein each first upstream data packet of the first upstream data packets comprises a respective first sequence number of the first sequence numbers, and wherein the first upstream service flow is from a third network device in the packet network or is replicating an upstream service flow from the third network device;

receiving, from a second network device in the packet network, a second upstream service flow comprising second upstream data packets comprising second sequence numbers identifying a sequence of the second upstream data packets in the second upstream service flow, wherein each second upstream data packet of the second upstream data packets comprises a respective second sequence number of the second sequence numbers, and wherein the second upstream service flow is from a fourth network device in the packet network or is replicating an upstream service flow from the fourth network device;

obtaining a third upstream service flow based on a first reference sequence number, the first sequence numbers, and the second sequence numbers, wherein the third upstream service flow comprises third upstream data packets comprising third sequence numbers greater than the first reference sequence number, and wherein the first reference sequence number corresponds to a value of a sequence number in a packet sent by the first network device;

sending the third upstream service flow to a fifth network device;

receiving the upstream service flow from the third network device;

replicating the received upstream service flow from the third network device; and sending a fourth upstream service flow to the second network device, wherein the fourth upstream service flow is the received upstream service flow from the third network device or a service flow obtained by replicating the received upstream service flow from the third network device.

2. The method according to claim 1, wherein the method further comprises:

obtaining a first downstream service flow, wherein the first downstream service flow comprises a first downstream data packet, the first downstream data packet comprises a fourth sequence number identifying a sequence in the first downstream service flow, and wherein the first downstream service flow is a downstream service flow received by the first network device from the fifth network device or a service flow obtained by the first network device by replicating a downstream service flow from the fifth network device;

receiving, a second downstream service flow sent by the second network device, wherein the second downstream service flow comprises a second downstream data packet, the second downstream data packet comprises a fifth sequence number identifying a sequence in the second downstream service flow, and wherein the second downstream service flow is a downstream service flow received by the second network device from a sixth network device or a service flow obtained by the second network device by replicating a downstream service flow from a sixth network device;

obtaining a third downstream service flow based on a second reference sequence number, the fourth sequence number, and the fifth sequence number, wherein the third downstream service flow comprises a third downstream data packet, and wherein a sixth sequence number comprised in the third downstream data packet is greater than the second reference sequence number; and sending the third downstream service flow to the third network device.

3. The method according to claim 1, wherein the method further comprises:

receiving a downstream service flow from the fifth network device; replicating the downstream service flow from the fifth network device; and sending a fourth downstream service flow to the second network device, wherein the fourth downstream service flow is the downstream service flow from the fifth network device or a service flow obtained by replicating the downstream service flow from the fifth network device.

4. The method according to claim 1, wherein obtaining, by the first network device, the third upstream service flow comprises selecting, by the first network device as the third upstream service flow based on the first sequence numbers and the second sequence numbers, one or more upstream data packets from the first upstream data packets and the second upstream data packets, wherein the one or more upstream data packets comprise sequence numbers whose values are greater than the first reference sequence number, wherein an $i^{th}$ upstream data packet is any upstream data packet in the third upstream service flow, wherein a sequence number comprised in the $i^{th}$ upstream data packet is greater than the first reference sequence number, wherein a sequence number comprised in a $(i+1)^{th}$ upstream data packet is greater than the sequence number comprised in the $i^{th}$ upstream data packet, and wherein the $(i+1)^{th}$ upstream data packet follows the $i^{th}$ upstream data packet in the third upstream service flow.

5. The method according to claim 1, wherein obtaining, by the first network device, the third upstream service flow comprises:

sorting, based on an arrival moment of the first upstream data packets and an arrival moment of the second upstream data packets, the first upstream data packets and the second upstream data packets to obtain a sorted upstream service flow; and selecting, as the third upstream service flow from the sorted upstream service flow, one or more upstream data packets comprising sequence numbers whose values are greater than the first reference sequence number, wherein a sequence number comprised in an $i^{th}$ upstream data packet in the third upstream service flow is greater than the first reference sequence number, wherein an arrival moment of an $(i+1)^{th}$ upstream data packet in the third upstream service flow is later than an arrival moment of the $i^{th}$ upstream data packet, wherein a sequence number comprised in the $(i+1)^{th}$ upstream data packet is greater than the sequence number comprised in the $i^{th}$ upstream data packet, and wherein the $i^{th}$ upstream data packet is any upstream data packet in the third upstream service flow.

6. The method according to claim 2, wherein obtaining, by the first network device, the third downstream service flow based on the second reference sequence number, the fourth sequence number, and the fifth sequence number comprises selecting, as the third downstream service flow based on the fourth sequence number and the fifth sequence number, one or more downstream data packets from the first downstream data packet and the second downstream data packet, wherein the one or more downstream data packets comprise sequence numbers whose values are greater than the second reference sequence number, and wherein a $j^{th}$ downstream data packet is any downstream data packet in the third downstream service flow, a sequence number comprised in the $j^{th}$ downstream data packet is greater than the second reference sequence number, a sequence number comprised in a $(j+1)^{th}$ downstream data packet is greater than the sequence number comprised in the $j^{th}$ downstream data packet, and the $(j+1)^{th}$ downstream data packet follows the $j^{th}$ downstream data packet in the third downstream service flow.

7. The method according to claim 2, wherein obtaining, by the first network device, the third downstream service flow based on the second reference sequence number, the fourth sequence number, and the fifth sequence number comprises:

sorting, based on an arrival moment of the first downstream data packet and an arrival moment of the second downstream data packet, the first downstream data packet and the second downstream data packet to obtain a sorted downstream service flow; and selecting, as the third downstream service flow from the sorted downstream service flow, one or more downstream data packets comprising sequence numbers whose values are greater than the second reference sequence number, wherein a sequence number comprised in a $j^{th}$ downstream data packet in the third downstream service flow is greater than the second reference sequence number, wherein an arrival moment of a $(j+1)^{th}$ downstream data packet in the third downstream service flow is later than an arrival moment of the $j^{th}$ downstream data packet, wherein a sequence number comprised in a $(j+1)^{th}$ downstream data packet is greater than the sequence number comprised in the $j^{th}$ downstream data packet, and wherein the $j^{th}$ downstream data packet is any downstream data packet in the third downstream service flow.

8. The method according to claim 1, wherein the method further comprises updating, by the first network device, a value of the first reference sequence number to a maximum value of a sequence number comprised in a upstream data packet in the third upstream service flow.

9. The method according to claim 2, further comprising updating, by the first network device, a value of the second reference sequence number to a maximum value of a sequence number comprised in a downstream data packet in the third downstream service flow.

10. The method according to claim 2, wherein the first network device is a first provider edge (PE) device, the second network device is a second PE device, the third network device is a customer edge (CE) device, and the fourth network device is a CE device, wherein the first network device is a first pseudo wire switching point (SPE), the second network device is a second SPE, the third network device is a first PE device, the fourth network device is a second PE device, and the first PE device and the second PE device communicate with a same CE device, wherein the first network device is a first SPE, the second network device is a second SPE, the third network device is a first PE device, the fourth network device is a second PE device, and the first PE device and the second PE device belong to a network device group, or wherein the first network device is a first SPE, the second network device is a second SPE, the third network device is a first PE device, the fourth network device is a second PE device, the first PE device and the second PE device belong to a network device group, and the first PE device and the second PE device communicate with a same CE device.

11. The method according to claim 10, wherein the fifth network device and the sixth network device are PE devices, or the fifth network device and the sixth network device are different SPEs.

12. An apparatus for processing a service flow in a packet network, wherein the apparatus is disposed in a first network device in a network device group, and wherein the apparatus comprises:

a memory; and a processor coupled to the memory and configured to cause the apparatus to:

obtain a first upstream service flow comprising first upstream data packets comprising first sequence numbers identifying a sequence of the first upstream data packets in the first upstream service flow, wherein each first upstream data packet of the first upstream data packets comprises a respective first sequence number of the first sequence numbers, and wherein the first upstream service flow is from a third network device in the packet network or is obtained by replicating an upstream service flow from the third network device;

receive a second upstream service flow from a second network device in the packet network, wherein the second upstream service flow comprises second upstream data packets comprising second sequence numbers identifying a sequence of the second upstream data packets in the second upstream service flow, wherein each second upstream data packet of the second upstream data packets comprises a respective second sequence number of the second sequence numbers, and wherein the second upstream service flow is from a fourth network device in the packet network or is obtained by replicating an upstream service flow from the fourth network device;

obtain a third upstream service flow based on a first reference sequence number, the first sequence numbers and the second sequence numbers, wherein the third upstream service flow comprises third upstream data packets comprising third sequence numbers greater than the first reference sequence number, and wherein the first reference sequence number corresponds to a value of a sequence number in a packet sent by the first network device;

send the third upstream service flow to a fifth network device;

receive the upstream service flow from the third network device;

replicate the received upstream service flow from the third network device; and send a fourth upstream service flow to the second network device, wherein the fourth upstream service flow is the received upstream service flow from the third network device or a service flow obtained by replicating the received upstream service flow from the third network device.

13. The apparatus according to claim 12, wherein the processor is further configured to cause the apparatus to:
  obtain a first downstream service flow, wherein the first downstream service flow comprises a first downstream data packet, wherein the first downstream data packet comprises a fourth sequence number identifying a sequence in the first downstream service flow, and wherein the first downstream service flow is a downstream service flow received by the first network device from the fifth network device or a service flow obtained by the first network device by replicating a downstream service flow from the fifth network device;
  receive, a second downstream service flow sent by the second network device, wherein the second downstream service flow comprises a second downstream data packet, wherein the second downstream data packet comprises a fifth sequence number identifying a sequence in the second downstream service flow, and wherein the second downstream service flow is a downstream service flow received by the second network device from a sixth network device or a service flow obtained by the second network device by replicating a downstream service flow from a sixth network device;
  obtain a third downstream service flow based on a second reference sequence number, the fourth sequence number, and the fifth sequence number, wherein the third downstream service flow comprises a third downstream data packet, and wherein a sixth sequence number comprised in the third downstream data packet is greater than the second reference sequence number; and
  send the third downstream service flow to the third network device.

14. The apparatus according to claim 12, wherein the processor is further configured to cause the apparatus to: receive a downstream service flow from the fifth network device; replicate the downstream service flow from the fifth network device; and send a fourth downstream service flow to the second network device, wherein the fourth downstream service flow is the downstream service flow from the fifth network device or a service flow obtained by replicating the downstream service flow from the fifth network device.

15. The apparatus according to claim 12, wherein the processor is further configured to cause the apparatus to select, as the third upstream service flow based on the first sequence numbers and the second sequence numbers, one or more upstream data packets from the first upstream data packets and the second upstream data packets, wherein the one or more upstream data packets comprise sequence numbers whose values are greater than the first reference sequence number, wherein an $i^{th}$ upstream data packet is any upstream data packet in the third upstream service flow, wherein a sequence number comprised in the $i^{th}$ upstream data packet is greater than the first reference sequence number, wherein a sequence number comprised in a $(i+1)^{th}$ upstream data packet is greater than the sequence number comprised in the $i^{th}$ upstream data packet, and wherein the $(i+1)^{th}$ upstream data packet follows the $i^{th}$ upstream data packet in the third upstream service flow.

16. The apparatus according to claim 12, wherein the processor is further configured to cause the apparatus to:
  sort, based on an arrival moment of the first upstream data packets and an arrival moment of the second upstream data packets, the first upstream data packets and the second upstream data packets to obtain a sorted upstream service flow; and
  select, as the third upstream service flow from the sorted upstream service flow, one or more upstream data packets comprising sequence numbers whose values are greater than the first reference sequence number, wherein a sequence number comprised in an $i^{th}$ upstream data packet in the third upstream service flow is greater than the first reference sequence number, wherein an arrival moment of an $(i+1)^{th}$ upstream data packet in the third upstream service flow is later than an arrival moment of the $i^{th}$ upstream data packet, wherein a sequence number comprised in the $(i+1)^{th}$ upstream data packet is greater than the sequence number comprised in the $i^{th}$ upstream data packet, and wherein the $i^{th}$ upstream data packet is any upstream data packet in the third upstream service flow.

17. The apparatus according to claim 13, wherein the processor is further configured to cause the apparatus to select, as the third downstream service flow based on the fourth sequence number and the fifth sequence number, one or more downstream data packets from the first downstream data packet and the second downstream data packet, wherein the one or more downstream data packets comprise sequence numbers whose values are greater than the second reference sequence number, wherein a $j^{th}$ downstream data packet is any downstream data packet in the third downstream service flow, wherein a sequence number comprised in the $j^{th}$ downstream data packet is greater than the second reference sequence number, wherein a sequence number comprised in a $(j+1)^{th}$ downstream data packet is greater than the sequence number comprised in the $j^{th}$ downstream data packet, and wherein the $(j+1)^{th}$ downstream data packet follows the $j^{th}$ downstream data packet in the third downstream service flow.

18. The apparatus according to claim 13, wherein the processor is further configured to cause the apparatus to:
  sort, based on an arrival moment of the first downstream data packet and an arrival moment of the second downstream data packet, the first downstream data packet and the second downstream data packet to obtain a sorted downstream service flow; and
  select, as the third downstream service flow from the sorted downstream service flow, one or more downstream data packets comprising sequence numbers whose values are greater than the second reference sequence number, wherein a sequence number comprised in a $j^{th}$ downstream data packet in the third downstream service flow is greater than the second reference sequence number, wherein an arrival moment of a $(j+1)^{th}$ downstream data packet in the third downstream service flow is later than an arrival moment of the $j^{th}$ downstream data packet, wherein a sequence number comprised in a $(j+1)^{th}$ downstream data packet is greater than the sequence number comprised in the $j^{th}$ downstream data packet, and wherein the $j^{th}$ downstream data packet is any downstream data packet in the third downstream service flow.

19. The apparatus according to claim 12, wherein the processor is further configured to cause the apparatus to update a value of the first reference sequence number to a maximum value of a sequence number comprised in a upstream data packet in the third upstream service flow.

20. The apparatus according to claim 13, wherein the processor is further configured to cause the apparatus to update a value of the second reference sequence number to a maximum value of a sequence number comprised in the downstream data packet in the third downstream service flow.

\* \* \* \* \*